US008442382B2

(12) United States Patent
Toma et al.

(10) Patent No.: US 8,442,382 B2
(45) Date of Patent: May 14, 2013

(54) STREAM GENERATION APPARATUS, STREAM GENERATION METHOD, CODING APPARATUS, CODING METHOD, RECORDING MEDIUM AND PROGRAM THEREOF

(75) Inventors: Tadamasa Toma, Osaka (JP); Tomoyuki Okada, Nara (JP); Hiroshi Yahata, Osaka (JP); Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 813 days.

(21) Appl. No.: 12/609,154

(22) Filed: Oct. 30, 2009

(65) Prior Publication Data

US 2010/0046922 A1 Feb. 25, 2010

Related U.S. Application Data

(60) Division of application No. 12/576,429, filed on Oct. 9, 2009, now Pat. No. 7,965,766, which is a continuation of application No. 10/580,468, filed as application No. PCT/JP2005/008318 on Apr. 25, 2005, now Pat. No. 7,889,788.

(30) Foreign Application Priority Data

| Apr. 28, 2004 | (JP) | 2004-134211 |
|---|---|---|
| Sep. 17, 2004 | (JP) | 2004-272517 |

(51) Int. Cl.
| *H04N 9/80* | (2006.01) |
| *H04N 5/92* | (2006.01) |
| *H04N 5/917* | (2006.01) |
| *H04N 7/12* | (2006.01) |
| *H04N 11/02* | (2006.01) |
| *H04N 11/04* | (2006.01) |

(52) U.S. Cl.
USPC .......... 386/248; 386/239; 386/326; 386/328; 375/240.01; 375/24.12

(58) Field of Classification Search .......... 386/239–248, 386/326–352; 375/240, 240.12, 240.13, 240.15
See application file for complete search history.

(56) References Cited

U.S. PATENT DOCUMENTS

| 5,241,659 A | 8/1993 | Parulski et al. |
| 5,270,831 A | 12/1993 | Parulski et al. |

(Continued)

FOREIGN PATENT DOCUMENTS

| CN | 1062064 | 6/1992 |
| CN | 1062065 | 6/1992 |

(Continued)

OTHER PUBLICATIONS

Extended European Search Report issued Jun. 30, 2010 in corresponding European patent application No. 10153250.5.

(Continued)

*Primary Examiner* — Hung Dang
(74) *Attorney, Agent, or Firm* — Wenderoth, Lind & Ponack, L.L.P.

(57) ABSTRACT

A stream generation apparatus generates a stream including coded pictures and a command for managing a buffer which holds a decoded picture, the command being added to one of the coded pictures as a reference picture. A judging unit judges whether or not the coded picture to which the command is added is skipped at the time of trick-play, and an adding unit adds, in the case where the coded picture is judged to be skipped, repetition information indicating the same contents as the command to another coded picture that follows, in decoding order, the coded picture judged to be skipped and that is not skipped at the time of the trick-play. A generating unit generates the stream including the coded pictures, the command and the repetition information.

3 Claims, 35 Drawing Sheets

U.S. PATENT DOCUMENTS

| | | | | |
|---|---|---|---|---|
| 5,410,415 | A | 4/1995 | Parulski et al. | |
| 5,543,925 | A | 8/1996 | Timmermans | |
| 5,574,564 | A | 11/1996 | Timmermans | |
| 5,583,653 | A | 12/1996 | Timmermans | |
| 5,633,726 | A | 5/1997 | Timmermans | |
| 5,768,470 | A * | 6/1998 | Muto | 386/355 |
| 5,835,674 | A | 11/1998 | Timmermans | |
| 5,862,297 | A | 1/1999 | Timmermans | |
| 6,009,229 | A | 12/1999 | Kawamura | |
| 6,026,213 | A | 2/2000 | Higurashi et al. | |
| 6,134,200 | A | 10/2000 | Timmermans | |
| 6,317,557 | B1 | 11/2001 | Higurashi et al. | |
| 6,349,653 | B1 | 2/2002 | Siedlarczyk | |
| 6,445,738 | B1 | 9/2002 | Zdepski et al. | |
| 7,308,145 | B2 * | 12/2007 | Abe et al. | 382/233 |
| 7,505,518 | B2 * | 3/2009 | Kadono et al. | 375/240.25 |
| 2001/0005444 | A1 | 6/2001 | Higurashi et al. | |
| 2001/0021306 | A1 | 9/2001 | Higurashi et al. | |
| 2002/0016970 | A1 | 2/2002 | Negishi et al. | |
| 2002/0018643 | A1 | 2/2002 | Okada et al. | |
| 2002/0114388 | A1 * | 8/2002 | Ueda et al. | 375/240.01 |
| 2002/0146239 | A1 | 10/2002 | Hamasaka et al. | |
| 2002/0191958 | A1 | 12/2002 | Lin et al. | |
| 2003/0071971 | A1 | 4/2003 | Jo | |
| 2004/0013399 | A1 | 1/2004 | Horiguchi et al. | |
| 2004/0017951 | A1 | 1/2004 | Koto et al. | |
| 2004/0146212 | A1 | 7/2004 | Kadono et al. | |
| 2005/0147375 | A1 * | 7/2005 | Kadono | 386/4 |

FOREIGN PATENT DOCUMENTS

| | | | |
|---|---|---|---|
| CN | 1064186 | | 9/1992 |
| CN | 1220065 | | 6/1999 |
| CN | 1269576 | | 10/2000 |
| CN | 1293516 | | 5/2001 |
| EP | 1 030 302 | | 8/2000 |
| EP | 1 326 443 | | 7/2003 |
| JP | 2003-18549 | | 1/2003 |
| JP | 2003-299103 | | 10/2003 |
| JP | 2004-088135 | | 3/2004 |
| JP | 2004-088723 | | 3/2004 |
| JP | 2004-228617 | | 8/2004 |
| WO | WO 03/088678 A1 | * | 10/2003 |
| WO | WO 03/090474 | * | 10/2003 |

OTHER PUBLICATIONS

Office Action issued Oct. 12, 2010 in U.S. Appl. No. 12/576,429.

International Search Report issued Oct. 4, 2005 in International (PCT) Application No. PCT/JP2005/008318.

PCT Written Opinion of the International Searching Authority issued Oct. 4, 2005 in International (PCT) Application No. PCT/JP2005/008318.

Chinese Notification of Completion of Formalities for Registration and Notification of Grant of Rights for Invention Patent (and English translation thereof) issued Nov. 6, 2012 in Chinese Application No. 200910208146.4.

* cited by examiner

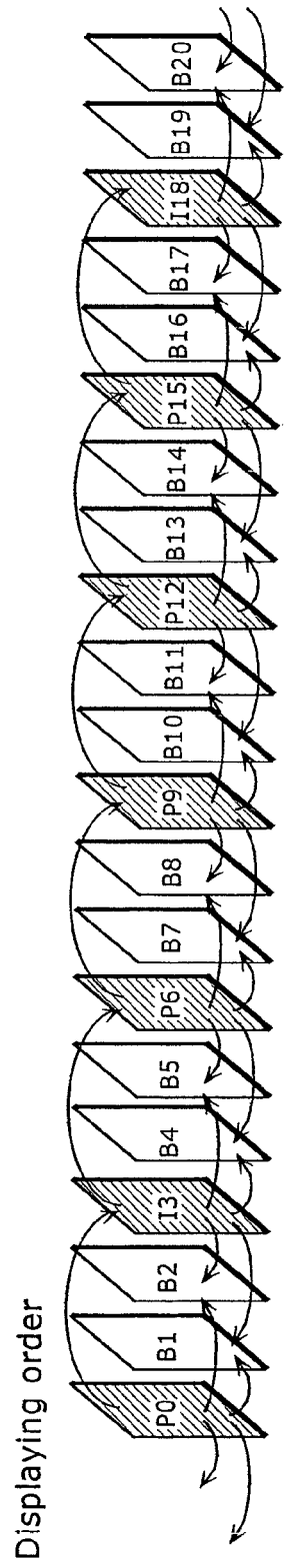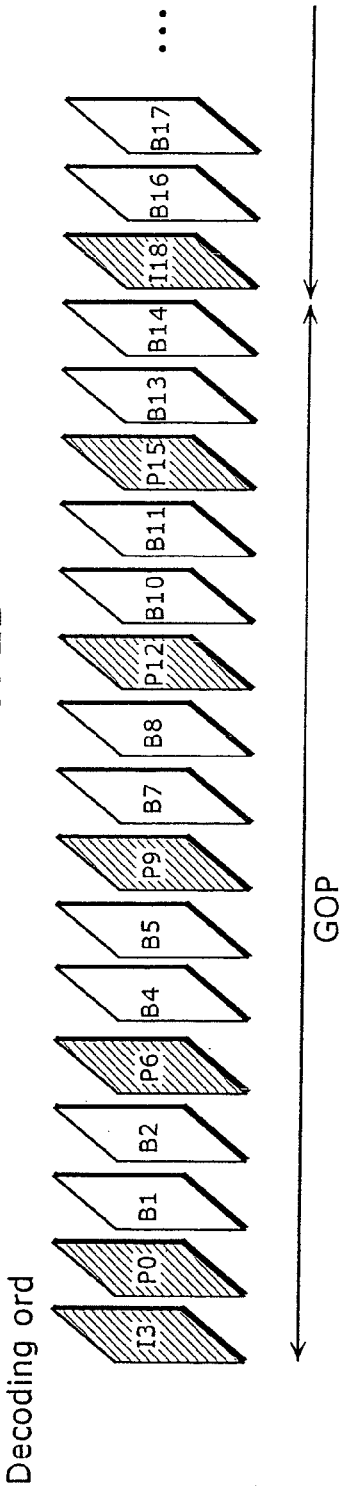

Store data for one frame

Long term memory   Short term memory

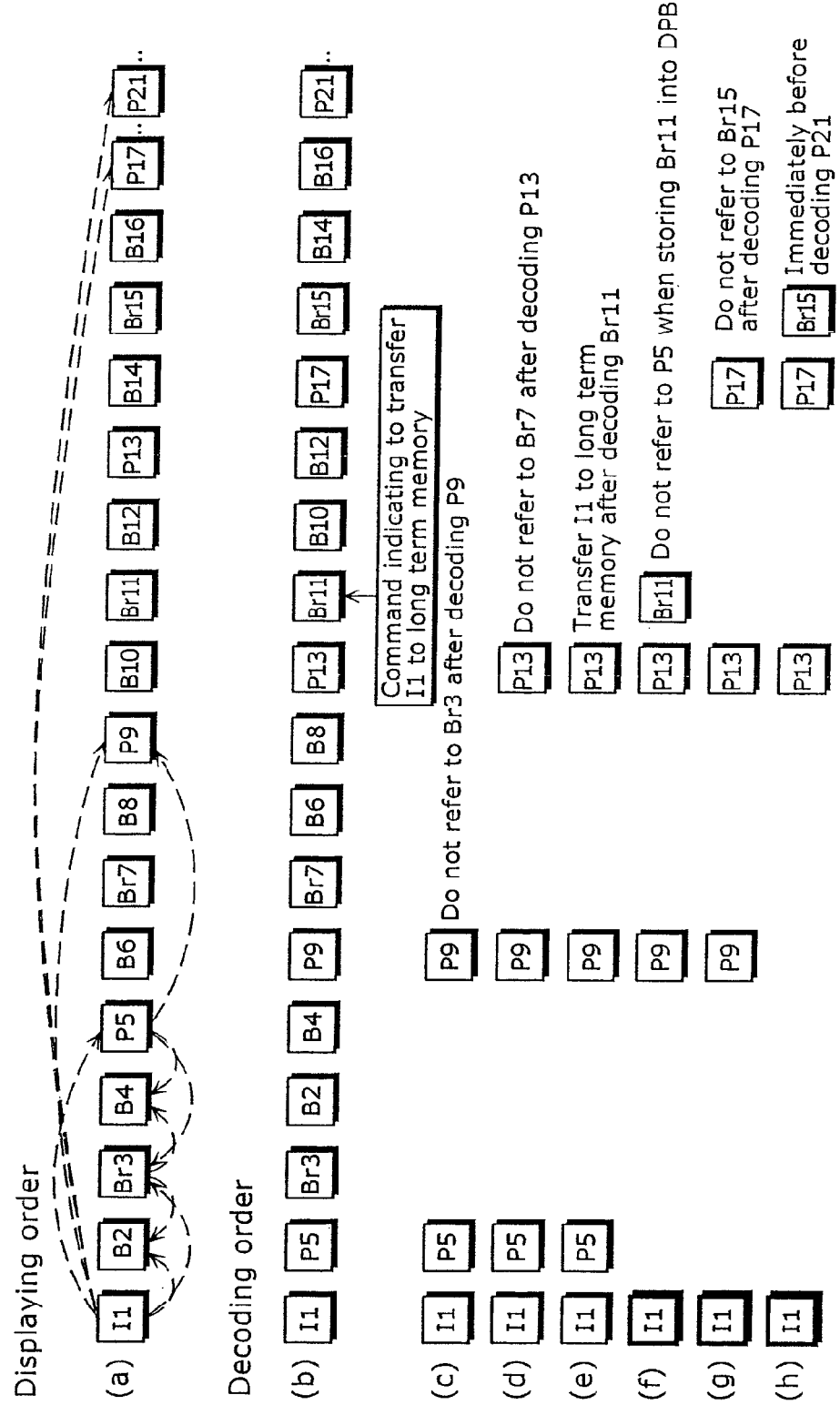

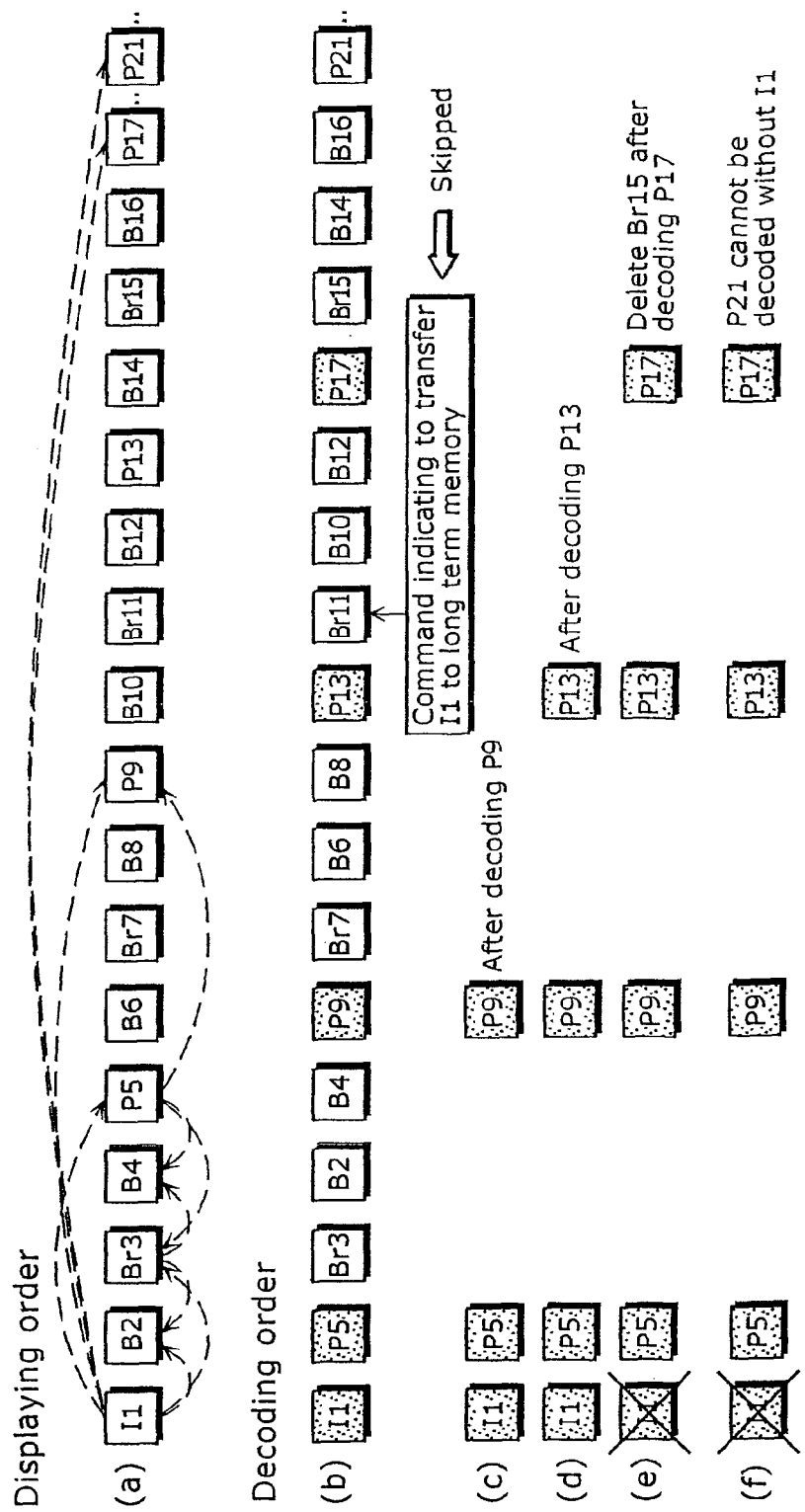

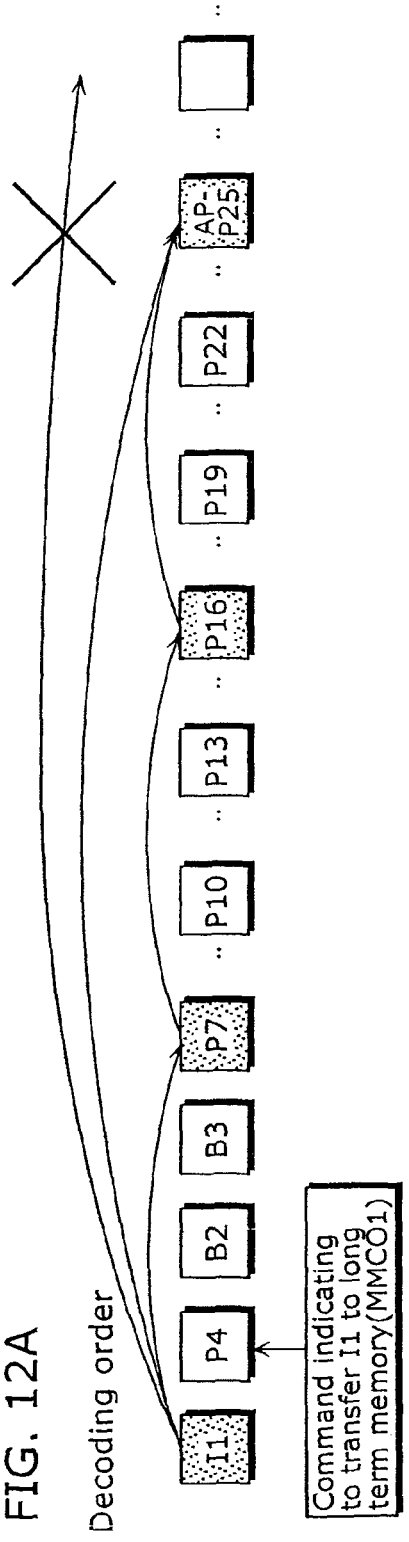
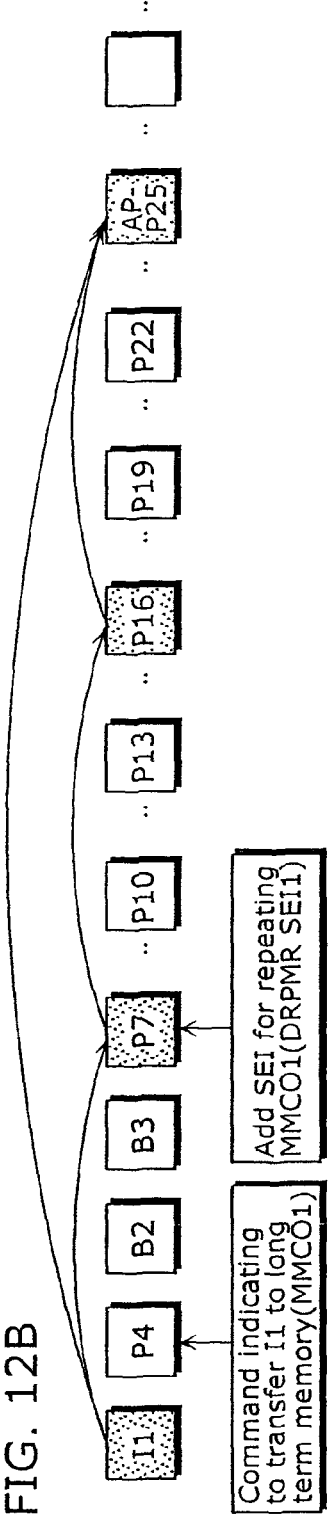

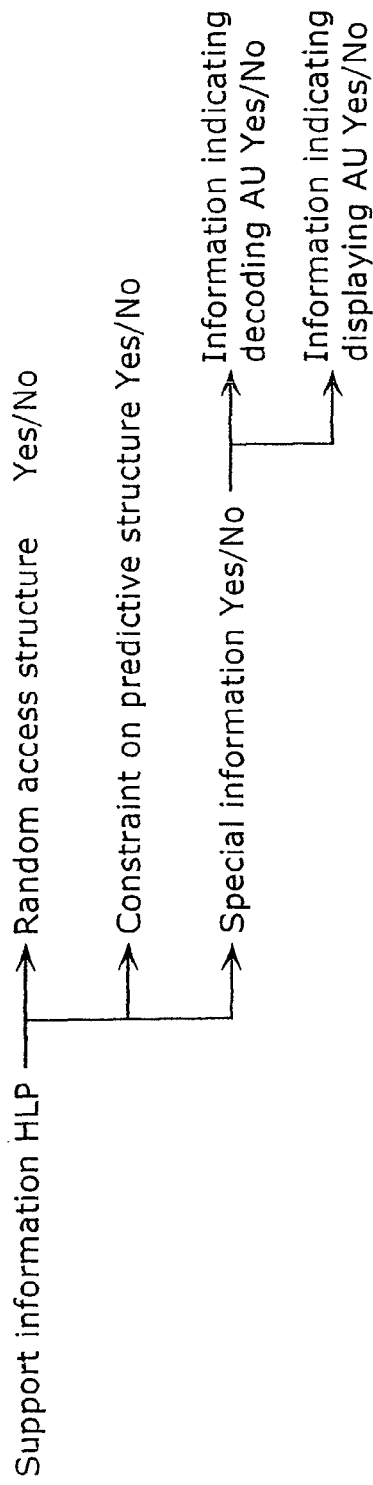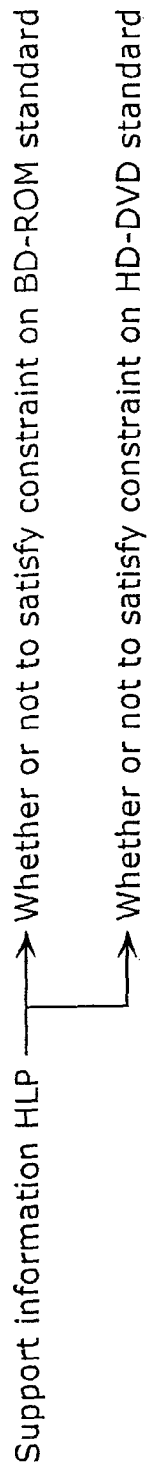

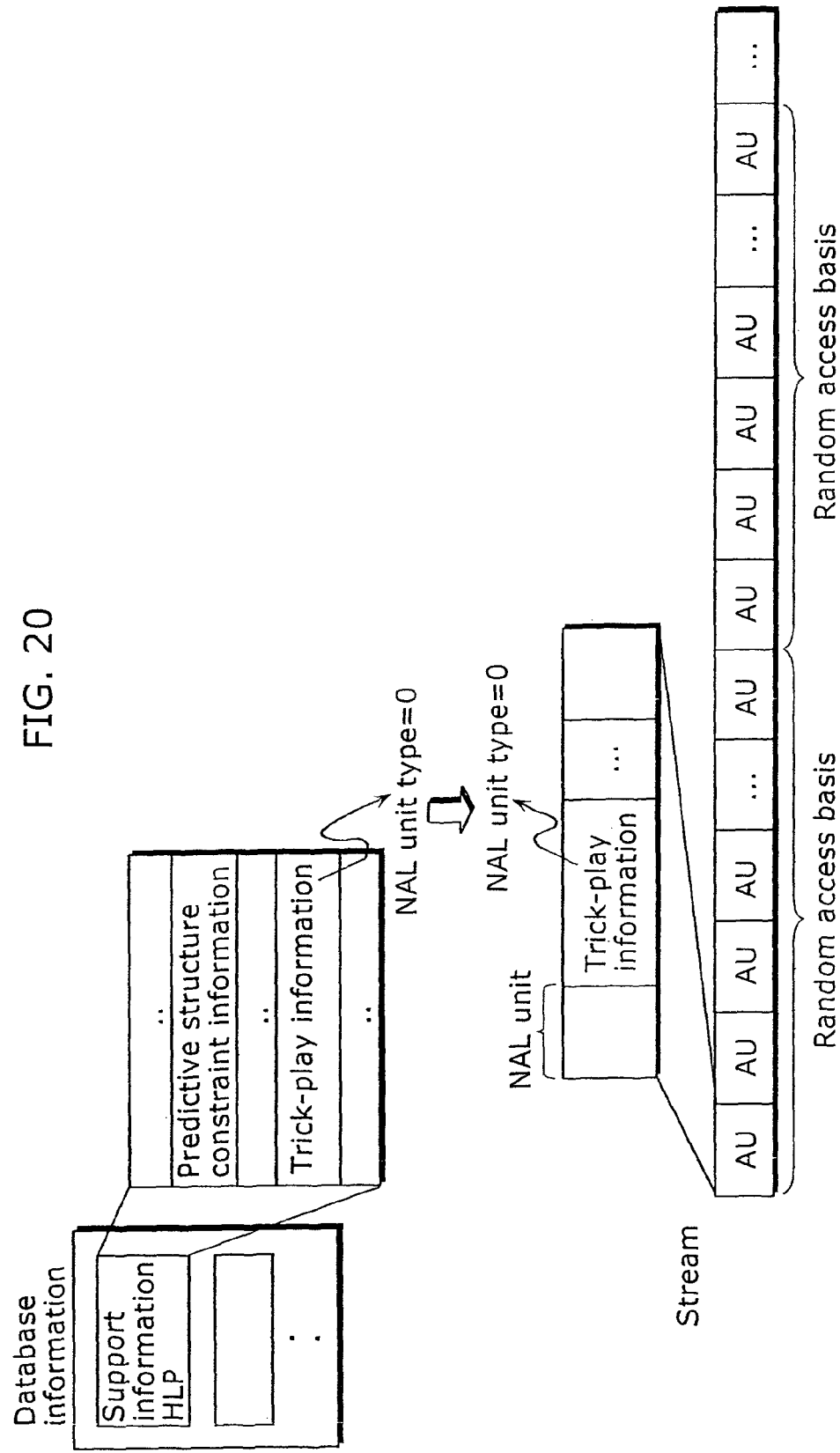

STREAM GENERATION APPARATUS, STREAM GENERATION METHOD, CODING APPARATUS, CODING METHOD, RECORDING MEDIUM AND PROGRAM THEREOF

This application is a divisional of application Ser. No. 12/576,429, filed Oct. 9, 2009, now U.S. Pat. No. 7,965,766, which is a continuation of application Ser. No. 10/580,468, filed May 25, 2006, now U.S. Pat. No. 7,889,788, which is the National Stage of International Application No. PCT/JP2005/08318, filed Apr. 25, 2005, the contents of which is fully incorporated herein by reference.

TECHNICAL FIELD

The present invention relates to a stream generation apparatus which generates a stream including coded pictures, a stream generation method, a picture coding apparatus, a picture coding method, a recording medium and a program thereof.

BACKGROUND ART

In the age of multimedia which integrally handles audio, video and other pixel values, existing information media, specifically, newspaper, magazine, television, radio, telephone and the like through which information is conveyed to people, have recently come to be included in the scope of multimedia. Generally, multimedia refers to something that is represented by associating not only characters, but also graphics, sound, and especially images and the like, together, but in order to include the aforementioned existing information media in the scope of multimedia, it becomes a prerequisite to represent such information in a digital form.

However, if the amount of information carried by each of the mentioned information media is estimated as the amount of digital information, while the amount of information for 1 character in the case of text is 1 to 2 bytes, the amount of information required for sound is 64 Kbits per second (telephone quality), and 100 Mbits or over per second becomes necessary for moving pictures (current television receiving quality), it is not realistic for the information media to handle such an enormous amount of information as it is in digital form. For example, although video phones are already in the actual use via Integrated Services Digital Network (ISDN) which offers a transmission speed of 64 Kbit/s to 1.5 Mbit/s, it is impossible to transmit images on televisions and images taken by cameras directly through ISDN.

Accordingly, information compression techniques have become required, and for example, in the case of the video phone, the H.261 and H.263 standards for moving picture compression technology, internationally standardized by the International Telecommunication Union-Telecommunication Standardization Sector (ITU-T), are being employed. Moreover, with MPEG-1 standard information compression techniques, it has also become possible to store video information onto general music compact discs (CD) together with audio information.

Here, Moving Picture Experts Group (MPEG) is an international standard for moving picture signal compression standardized by International Organization for Standardization and International Electrotechnical Commission (ISO/IEC). The MPEG-1 is a standard for compressing moving picture signals up to 1.5 Mbps, in other words, compressing television signals up to approximately a hundredth part. Moreover, since target picture quality within the scope of the MPEG-1 standard is limited to a medium degree of quality which can be realized by a transmission speed of primarily about 1.5 Mbps, the use of MPEG-2, which was standardized to satisfy demands for further improved picture quality, realizes television broadcasting quality with moving picture signals compressed to 2 to 15 Mbps. Furthermore, currently, MPEG-4, which has exceeded MPEG-1 and MPEG-2 compression ratios, and also enables coding, decoding and operating on a per-object base, and realizes the new functions required for the multimedia age, has been standardized by the work group (ISO/IEC JTC1/SC29/WG11) that has promoted the standardization of MPEG-1 and MPEG-2. The MPEG-4 was initially aimed at standardizing a low bit rate coding method. However, currently, this has been expanded to the standardization of a more versatile coding method further including high bit rate coding for interlaced pictures. After that, MPEG-4 Advanced Video Coding (AVC) is standardized as a next generation picture coding method with higher compression ratio by a cooperation of ISO/IEC and ITU-T. It is prospected to be used for next generation optical disc related devices or for a broadcast directed to cell phone terminals.

Generally, in coding of a moving picture, the amount of information is compressed by reducing redundancy in temporal and spatial directions. Accordingly, in an inter-picture prediction coding which aims at reducing the temporal redundancy, a motion estimation and a generation of a predictive picture are performed on a block-by-block basis by referring to a preceding or following picture, and a difference value between the obtained predictive picture and a picture to be coded is coded. Here, a picture indicates a screen: it indicates a frame in a progressive picture; and it indicates a frame or a field in an interlaced picture. Here, the interlaced picture is a picture whose frame is made up of two fields which differ temporally each other. In a coding and decoding of the interlaced picture, it is allowed to process one frame as a frame, to process it as two fields, or to process it as a frame structure or as a field structure on a block-by-block basis in the frame.

An I picture is a picture that is intra coded without referring to a reference picture. Also, a P picture is a picture that is inter-picture prediction coded by only referring to one picture. Further, a B picture is a picture that can be inter-picture prediction coded by referring to two pictures at the same time. The B picture can refer to two pictures as a pair of any pictures which are displayed before or after the B picture. A reference picture can be specified for each block which is a basic unit for coding and decoding. The reference picture which is precedently described in a coded bit stream is distinguished as a first reference picture with the reference picture which is subsequently described as a second reference picture. Note that, as a condition for coding and decoding these pictures, it is necessary that a picture to be referred has already been coded and decoded.

FIG. 1 is a drawing showing a structure of a stream of the conventional MPEG-2. As shown in FIG. 1, the stream of the MPEG-2 has a hierarchical structure as described in the following. The stream is made up of more than one Groups of Pictures (GOP), and an editing and random accessing of a moving picture are allowed by using the stream as a basic unit for coding. Each GOP is made up of more than one picture. Each picture is one of an I picture, a P picture or a B picture. Each stream, GOP and picture is further made up of synchronous code (sync) which indicates a breakpoint of each unit and a header which is common data in the unit.

FIG. 2A and FIG. 2B are drawings showing an example of a predictive structure among pictures used in MPEG-2. In the drawings, pictures shown as diagonally shaded area are pictures to be referred by other pictures. As shown in FIG. 2A, in MPEG-2, P picture (P0, P6, P9, P12, P15) can be prediction coded by referring to an I picture or P picture that is displayed immediately before the P picture. Further, B picture (B1, B2, B4, B5, B7, B8, B10, B11, B13, B14, B16, B17, B19, B20) can be prediction coded by referring to an I picture or P picture that is displayed prior to and following to the B picture Furthermore, arranging order in a stream has been determined as follows: the I pictures and P pictures are arranged in displaying order; and each of the B pictures is arranged immediately after an I picture or P picture that is displayed immediately after the B picture. As a GOP structure, for example, as shown in FIG. 2B, pictures from I3 to B14 can be included in one GOP.

FIG. 3 is a drawing showing a structure of a stream of MPEG-4 AVC. In MPEG-4 AVC, there is no concept equivalent to the GOP. Therefore, in the case where an arrangement method of parameter sets that are described later and predictive structure of pictures are not constrained, it is necessary to search a picture whose picture data is sequentially analyzed and can be decoded when randomly accessed. However, by separating data into special picture units by which each picture is decoded without depending on other pictures, it is possible to construct a unit which can be randomly accessed and is equivalent to the GOP. Such separated units are called random access units (RAU) and a stream which is made up of RAUs is called a stream having a random access structure.

Here, it is explained about the access unit (hereafter referred to as AU) which is a basic unit for dealing with a stream. An AU is a unit used for storing coded data in one picture, including parameter sets and slice data. The parameter sets are divided into a picture parameter set (PPS) which is data corresponding to a header of each picture and a sequence parameter set (SPS) which is corresponding to a header of a unit of GOP in MPEG-2 and more. The SPS includes a maximum number of pictures available for reference, picture size and the like. The PPS includes a variable length coding method, an initial value of quantization step, and a number of reference pictures. An identifier indicating which one of the PPS and SPS is referred is attached to each picture.

For the I pictures of MPEG-4 AVC, there are two types of the I pictures: an Instantaneous Decoder Refresh (IDR) picture; and an I picture which is not the IDR picture. The IDR picture is an I picture which can be decoded without referring to a picture preceding to the IDR picture in decoding order, that is, whose condition necessary for decoding is reset, and is equivalent to a leading I picture of a closed GOP of MPEG-2. For the I picture which is not the IDR picture, a picture which follows the I picture in decoding order may refer to a picture which is preceding to the I picture in decoding order. Here, the IDR picture and I picture indicate pictures made up of only I slices. The P picture indicates a picture made up of P slices or I slices. The B picture indicates a picture made up of B slices, P slices or I slices. Note that the slices of the IDR picture and the slices of the non-IDR picture are stored in different types of NAL units.

The AU of MPEG-4 AVC can include, in addition to data necessary for decoding a picture, supplemental information called Supplemental Enhancement Information (SEI) which is unnecessary for decoding a picture, boundary information of AU and the like. The data such as parameter set, slice data and SEI are all stored in a Network Abstraction Layer (NAL) unit (NALU). The NAL unit is made up of a header and a payload, and the header includes a field which indicates a type of data stored in the payload (hereafter referred to as NAL unit type). The value of the NAL unit type is defined for each type of data such as a slice and SEI. By referring to the NAL unit type, the type of data stored in the NAL unit can be specified. The NAL unit of SEI can store one or more SEI messages. The SEI message is also made up of a header and a payload and a type of information stored in the payload is identified by a type of SEI message indicated in the header.

FIG. 4 is a drawing showing an example of a predictive structure of the MPEG-4 AVC. In MPEG-4 AVC, an AU of P picture can refer to an AU of B picture. As shown in FIG. 4, the AU of P picture (P7) can refer to the AU of B picture (B2). Herein, in order to perform high-speed playback by displaying only the AUs of I pictures and P pictures, I0, B2, P4 and P7 have to be decoded. Thus, when trick-play such as jump-in playback, variable-speed playback or reverse playback is performed, the AUs necessary to be decoded cannot be determined in advance so that all AUs need to be decoded in the end. However, by storing, in a stream, supplemental information indicating AUs necessary to be decoded for the trickplay, the AUs to be decoded by referring to the supplemental information can be determined. Such supplemental information is called trick-play information. Further, if a constrain is previously set in a predictive structure such as that the AUs of P pictures do not refer to an AU of B picture, only the AUs of the I pictures and P pictures can be decoded and displayed. Furthermore, for the AUs of I pictures and P pictures, the AUs of I pictures and P pictures can be sequentially decoded and displayed if the decoding order is same as the displaying order.

FIG. 5 is a block diagram showing a structure of a conventional multiplexer.

A multiplexer 17 is a multiplexer which receives a video data, codes the inputted video data into streams of MPEG-4 AVC, generates database information about the coded data, multiplexes and records the coded data and the database information. It includes a stream attribute determination unit 11, a coding unit 12, a database information generation unit 13 having a general database information generation unit 14, a multiplexing unit 15 and a recording unit 16.

The stream attribute determination unit 11 determines a coding parameter for coding the MPEG-4 AVC and a constrained matter relating to a trick-play, and outputs them to the coding unit 12 as attribute information TYPE. Here, the constrained matter relating to the trick-play includes information about whether or not to apply a constraint for constructing a random access unit to a stream of the MPEG-4 AVC, whether or not to include information indicating an AU to be decoded when variable speed playback or reverse playback is performed, or whether or not to give a constrain on a predictive structure among AUs. The coding unit 12, based on the attribute information TYPE, codes the inputted video data into a stream of the MPEG-4 AVC, and outputs the access information in the stream to a general database information generation unit 14 while outputting the coded data to the multiplexing unit 15. Here, the access information indicates information on an access basis which is a basic unit for accessing to a stream, including a start address, size, displayed time and the like of a leading AU in the access basis. The stream attribute determination unit 11 further outputs information necessary for generating database information such as a compression method and a resolution as general database information to the general database information generation unit 14. The database information generation unit 13 generates database information, and is made up solely of the general database information generation unit 14. The general database information generation unit 14 generates, with the access information and the general database information, a table data to be referred when accessing to a stream and a table data in which attribute information such as a compression method are stored, and outputs the generated table data to the multiplexing unit 15 as database information INFO. The multiplexing unit 15 generates multiplexed data by multiplexing the coded data and the database information INFO, and outputs the multiplexed data to the recording unit 16. The recording unit 16 records the multiplexed data inputted from the multiplexing unit 15 into an optical disc, a hard disc or a recording medium such as a memory.

FIG. 6 is a block diagram showing a structure of a conventional demultiplexer.

A demultiplexer 27 is a demultiplexer which, in accordance with an externally inputted command which instructs to perform trick-play, separates, decodes and displays the AU data of MPEG-4 AVC from the optical disc on which a stream of the MPEG-4 AVC is recorded together with the database information. It includes a database information analyzing unit 21, a decoding/displaying AU determination unit 23, an AU separation unit 24, a decoding unit 25, and a displaying unit 26.

The database information analyzing unit 21 is made up solely of the general database information analyzing unit 22. A trick-play instruction signal for instructing to perform trick-play such as variable speed playback, reverse playback or jump-in playback is inputted to the general database information analyzing unit 22. When the trick-play instruction signal is inputted, the general database information analyzing unit 22 analyzes the inputted signal by obtaining access information ACS from the database information of the multiplexed data, obtains access destination information including address information of an access basis in which an AU which is to be decoded or displayed is included and the like, and notifies the AU separation unit 24. The AU separation unit 24 analyzes AUs which make up an access basis, obtains the trick-play information TRK about an AU to be decoded and displayed, and outputs the obtained information to the decoding/displaying AU determination unit. The decoding/displaying AU determination unit determines an AU to be decoded and displayed based on a predetermined rule, and notifies the identification information of the AU to be decoded and the identification information of the AU to be displayed respectively to the AU separation unit 24 and the displaying unit 26. The AU separation unit 24 separates the data in the AU to be decoded based on the access destination information, and outputs the separated data to the decoding unit 25. The decoding unit 25 decodes the inputted AU data, and outputs the decoded data to the displaying unit 25. Finally, the displaying unit 26 selects an AU which is indicated to be displayed in the display AU information, and displays the selected AU. (Refer to Japanese Laid-Open Patent Publication No. 2003-18549).

SUMMARY OF THE INVENTION

In the decoding apparatus, reference pictures or pictures which are waiting to be displayed are stored in a buffer memory called Decoded Picture Buffer (DPB) after the pictures are decoded. However, predictive structure of a picture is flexible in MPEG-4 AVC so that memory management in the DPB becomes complicated. Thus, there is a problem that it is difficult to perform trick-play such as fast forward. For example, in the case where high-speed playback which only decodes and displays I pictures and P pictures is performed, memory management information may be stored in a B picture to be skipped. If the memory management information indicates to hold a specific picture in a DPB without deleting it from the DPB, the information cannot be obtained. Therefore, the specific picture may be deleted from the DPB and the following I picture or P picture which refer to the specific picture may not be able to be decoded.

FIG. 7A and FIG. 7B are diagrams showing memory management of the DPB. As shown in FIG. 7A, picture data for a plurality of frames can be stored in the DPB. In this example, picture data for four frames can be stored. Also, in the DPB, two types of areas can be set: a long term memory; and a short term memory. The picture data stored in short term memories are bumped out sequentially from a picture of the earliest decoding order. On the other hand, the picture data stored in a long term memory is held in a DPB and can be referred by other pictures until it is set so as not to be referred by other pictures, by a memory management command called a Memory Management Control Operation (MMCO). For example, a long term memory is used when it is necessary to store the I picture for a longer term, such as when a leading I picture in the random access basis is referred by following pictures in decoding order. Note that the pictures stored in the short term memories also can be made non-referenced by the MMCO. For default, each picture is stored in a short term memory. Here, the memory management command can specify about how many memories for how many frames are allocated respectively for the long term memory and the short term memory. Note that the memory management command can be issued solely to the reference pictures. FIG. 7B shows an example where a memory for one frame is allocated for a long-term memory and memories for three frames are allocated for a short term memory out of frame memory for four frames. The allocation of the long term memory and the short term memory can be changed dynamically depending on the memory management command MMCO.

FIG. 8 shows an example of a use of the memory management command. FIG. 8(*a*) shows an arrangement of pictures in a random access basis. In the drawing, I, P, B and Br are respectively indicate an I picture, a P picture, an non-referenced B picture, and a reference B picture. The number attached to each picture indicates a displaying order. Here, the non-referenced picture B indicates a B picture which is not referred by other pictures, and the reference B picture indicates a B picture referred by other pictures. Also, arrows indicate predictive structures. For example, P9 indicates that it refers to P5 and I1, B2 refers to I1 and Br3, and Br3 refers to I1 and P5. The P pictures only refer to the I pictures or the P pictures so that the reference B picture is not referred. FIG. 8(*b*) shows pictures shown in FIG. 8(*a*), arranged in decoding order. Here, in Br11, it is assumed that a memory management command for transferring I1 to a long term memory is stored in header information of slices which constitute a picture. FIG. 8(*c*) to (*h*) shows pictures stored in a DPB when the DPB can store picture data for four frames. Here, Br refers to only an I picture or a P picture immediately before or after the Br in displaying order, and the Br is deleted from DPB according to the memory management command of an I picture or P picture which are two pictures after the Br in the displaying order. FIG. 8(*c*) shows pictures stored in the DPB after Br3 is deleted at P9. In the DPB, I1, P5 and P9 are all stored in the short term memory. After P13 is decoded, as shown in FIG. 8(*d*), I1, P5, P9 and P13 are stored in the DPB. Herein, DPB is full because four pictures are stored. Following that, after the Br11 is decoded, the Br11 should be stored in the DPB. However, since the DPB is full, it is necessary to delete one of the pictures stored in the DPB. Here, originally the I1 which was decoded at the earliest should be removed from the DPB. However, it is shown that a long term memory is assigned for the I1 so as to transfer the I1 to the long term memory (FIG. 8(*e*)). Accordingly, when Br11 is stored, as shown in FIG. 8(*f*), P5 which is decoded at the earliest is deleted from the pictures stored in the short term memories. Note that, the deletion of P5 is also executed by the memory management command so that the memory management command stored in the Br11 includes a command which specifically indicates to make the P5 non-referenced, in other words, indicates that the P5 can be deleted. FIG. 8(g) shows a state when Br 11 is deleted and P17 is stored in the DPB after P17 is decoded. Lastly, while P21 refers to the I1, the I1 is transferred to a long term memory when P21 is decoded and available for reference so that the I1 can be referred without any problems (FIG. 8(h)).

Next, it is explained about a problem of memory management when trick-play such as fast forward and jump-in playback is performed. Especially, a fast-forward playback by decoding and playing back only I pictures and P pictures (IP playback) has been introduced for a general use. FIG. 9 shows memory management when the random access unit that is same as what is shown in FIG. 8, is IP-played back. First, after decoding I1, P5 and P9, the I1, P5 and P9 are stored in short term memories of DPB as shown in FIG. 9(c). Next, after P13 is stored, four of the I1, P5, P9 and P13 are stored in the DPB so that the DPB becomes full herein (FIG. 9(d)). After that, originally, Br11 is set for a long term memory for storing I1 depending on a memory management command and the I1 is transferred to a long term memory. However, the Br11 is skipped without being decoded so that I1 remains to be stored in the short term memory. Accordingly, when decoded P17 is stored in DPB, the I1 is deleted because it has the earliest decoding order among pictures stored in the short term memories (FIG. 9(e)). Therefore, there are four pictures of P5, P9, P13 and P17 are stored in the DPB when P21 is decoded so that P21 cannot be decoded because there is no I1 (FIG. 9(f)). Thus, in the case where a picture is decoded while skipping pictures when trick-play is performed, if a picture in which a memory management command is stored is skipped, it causes a problem of a breakdown of memory management so that following pictures cannot be decoded correctly. Therefore, the IP playback cannot be realized without decoding all reference pictures and the amount of processing according to the IP playback has been increased.

An object of the present invention is to provide a stream generation apparatus, a stream generation method, a picture coding apparatus, a picture coding method, a recording medium and a program which, when trick-play is performed, prevents a breakdown of trick-play due to the reason that there is no reference picture necessary for decoding in a buffer, and realizes easily the trick-play of a picture by skip playback.

In order to achieve the above object, a stream generation apparatus according to the present invention is the stream generation apparatus which generates a stream including coded pictures and a command for managing a buffer which holds a decoded picture as a reference picture, the command being added to one of the coded pictures, the apparatus comprising: a judging unit operable to judge that whether or not the coded picture to which the command is added is to be skipped at the time of trick-play; an adding unit operable to add, in the case where the coded picture is judged to be skipped, repetition information indicating the same contents as the command to another coded picture that follows, in decoding order, the coded picture judged to be skipped and that is not skipped at the time of the trick-play; and a generating unit operable to generate the stream including the coded pictures, the command and the repetition information.

According to this structure, a breakdown of trick-play, which is caused by a reason that there is no reference picture necessary for decoding is in a buffer, can be prevented. In other words, the trick-play can be easily realized by skip playback of pictures.

Here, the command may instruct to change an attribute of the reference picture stored in the buffer from a short term memory to a long term memory.

According to this structure, the trick-play can be easily realized even in the case where there are two types of short term and long term reference pictures or in the case where the relationship among pictures is complicated.

Here, the judging unit may be operable to judge that a reference B picture is skipped at the time of trick-play, in the case where the coded picture to which the command is added is the reference B picture that is to be referred to when another coded picture is decoded.

In addition, the adding unit may be further operable to add the repetition information to one of an I picture and a P picture that follows, in decoding order, the reference B picture judged to be skipped.

According to this structure, in the case where the B pictures are also used as reference pictures in addition to the I pictures and P pictures, necessary reference pictures can be stored in a buffer for sure even when only I pictures and P pictures are skip-played back.

Here, the judging unit is operable to judge that a P picture is skipped at the time of trick-play, in the case where the coded picture to which the command is added is the P picture that is to be skipped when a specific P picture is decoded, and the specific P picture can be decoded by selectively decoding a preceding I picture or P picture in decoding order.

In addition, the adding unit may be operable to add the repetition information to the another picture that follows, in decoding order, the P picture judged to be skipped and that is necessary for decoding the specific P picture.

According to this structure, in the case where a skip playback using the access point P picture is performed, necessary reference pictures can be stored in a buffer for sure.

Further, the same units are included in the present invention of a stream generation method, a picture coding apparatus, a picture coding method, a recording medium and a program.

FURTHER INFORMATION ABOUT TECHNICAL BACKGROUND TO THIS APPLICATION

The disclosures of the following Japanese Patent Applications including specification, drawings and claims are incorporated herein by references on their entirety: Japanese Patent Application No. 2004-134211 filed on Apr. 28, 2004 and Japanese Patent Application No. 2004-272517 filed on Sep. 17, 2004.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 2A and FIG. 2B are drawings showing an example of a GOP structure in the MPEG-2 video.

FIG. 8 is a drawing showing an example when a use of a memory management command is necessary.

FIG. 9 is a drawing showing memory management when I and P pictures in a random access unit that is shown in FIG. 9 are played back.

FIG. 12A is a drawing showing pictures and a memory management command when AP-P picture is used in the conventional technology.

FIG. 12B is a drawing showing pictures and a memory management command when AP-P picture is used according to the first embodiment.

FIG. 19A and FIG. 19B are diagrams showing contents of playback support information.

FIG. 20 is a drawing showing a method for specifying a NAL unit in which the playback support information is stored.

DETAILED DESCRIPTION OF THE INVENTION

Hereafter, it is explained about embodiments of the present invention with references to drawings.

First Embodiment

In this embodiment, it is explained about a coding apparatus and a decoding apparatus which can obtain a command necessary for managing memories in a DPB only from pictures necessary for skip playback when trick-play is performed.

The coding apparatus generates a stream including a memory management command and coded pictures. When the stream is generated, the coding apparatus judges whether or not a coded picture to which a memory management command is added is skipped when trick-play is performed, in the case where it is judged as a coded picture to be skipped, repetition information indicating the same contents as the command is added to a coded picture which is not skipped and is decoded after the coded picture to be skipped, when trick-play is performed.

Figure 10:
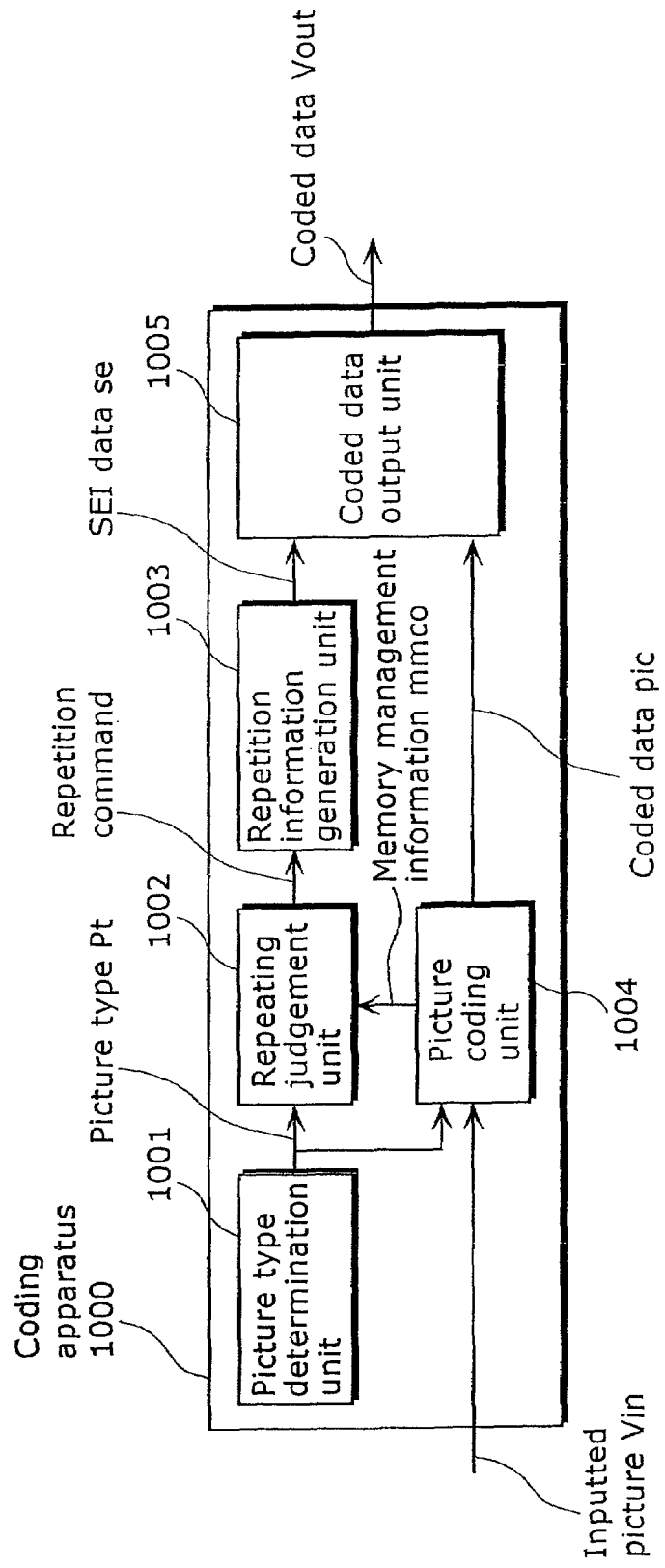
FIG. 10 is a block diagram showing a structure of a coding apparatus according to a first embodiment.

FIG. 10 is a block diagram showing a structure of a coding apparatus 1000 in the present embodiment. The coding apparatus 1000 includes a picture type determination unit 1001, a repetition judgement unit 1002, a repetition information generation unit 1003, a picture coding unit 1004, and a coded data output unit 1005. The picture type determination unit 1001 determines a picture type of a picture to be coded and inputs the determined picture type Pt to the repetition judgement unit 1002 and the picture coding unit 1004. The picture coding unit 1004 codes an inputted picture Vin depending on the picture type Pt, inputs the coded data pic to the coded data output unit 1005, and inputs memory management information mmco to the repetition judgement unit 1002. If the memory management information mmco is not issued for the coded picture, that is indicated in the memory management information mmco. The repetition judgement unit 1002 judges whether or not to repeat a memory management command based on the memory management information mmco and the picture type Pt, and inputs a result of the judgment to the repetition information generation unit 1003 as a repetition command Re. The repetition information generation unit 1003 generates a DRPMR SEI when the repetition command Re instructs to repeat the memory management command, and inputs the SEI data sei to the coded data output unit 1005. Here, when the repetition command Re instructs to repeat the memory management command, information necessary for generating the DRPMR SEI is also inputted to the repetition information generation unit 1003. The coded data output unit 1005 outputs the coded data pic and SEI data sei.

Thus, the SEI data sei generated according to the repetition command Re includes same contents as the memory management information mmco, and substantially includes a copy of the memory management information mmco.

Figure 11:
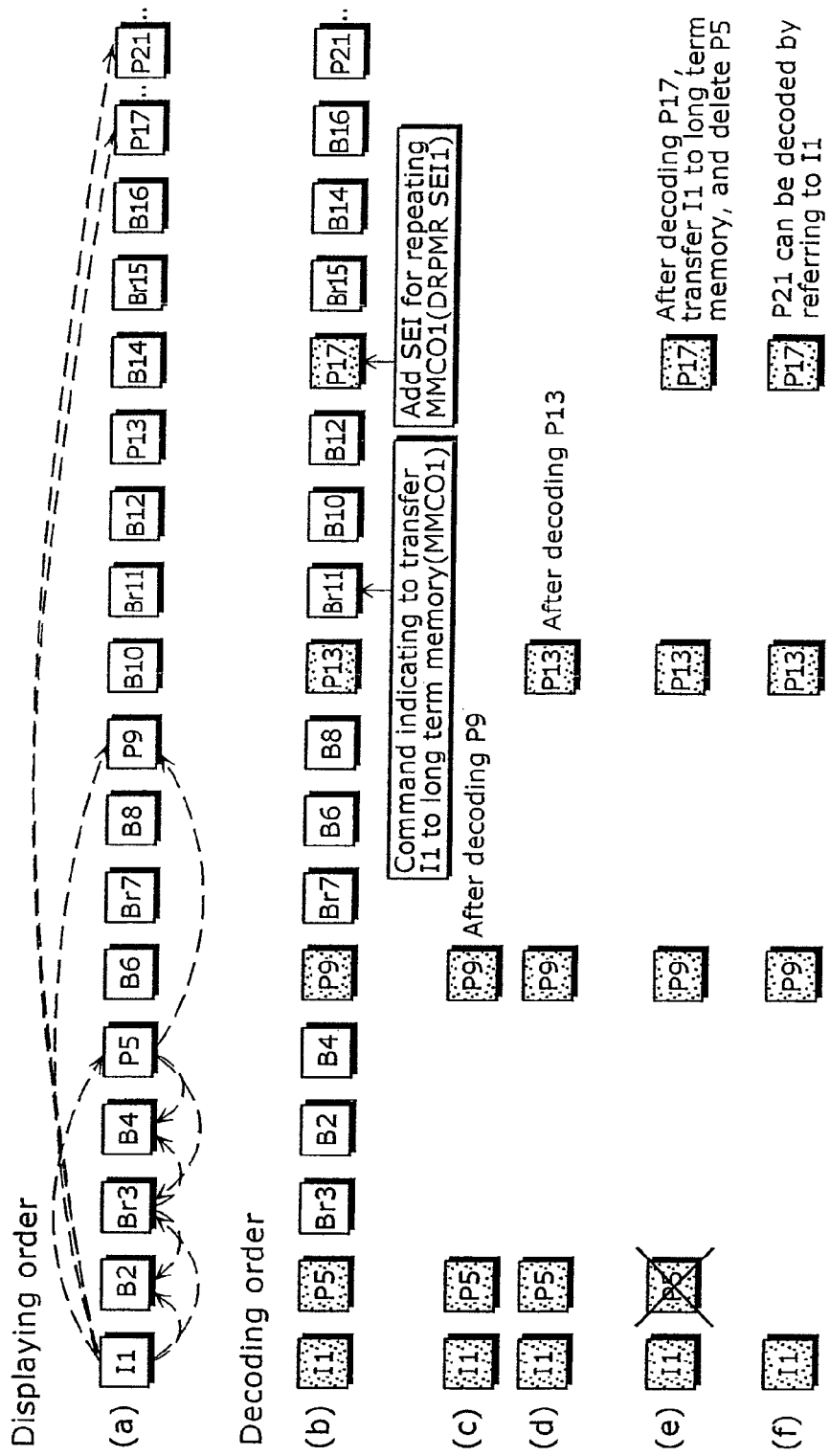
FIG. 11 is a drawing showing a method of repeating a memory management command.

FIG. 11 shows a random access unit of a MPEG-4 AVC stream stored in the information recording medium as an example of a stream coded by the coding apparatus 1000 in the present embodiment. While the example is same as the conventional example shown in FIG. 9, it differs with the conventional example in that a memory management command stored in Br11 is repeated at P17 using Decoded Reference Picture Marking Repetition Supplemental Enhancement Information (hereafter referred to as DRPMR SEI). Specifically, a memory management command set in Br11 for transferring I1 to a long term memory by making P5 non-referenced is repeated in P17. Accordingly, even if Br11 is skipped when the IP is played back, it is known that the I1 is transferred to a long term memory at Br11 when P17 is decoded. Consequently, I1 is transferred to the long term memory, P5 is deleted from the DPB after P17 is decoded, and P17 is stored instead (FIG. 11(e)). Therefore, as shown in FIG. 11(f), there is I1 in DPB when P21 is decoded so that P21 can be decoded by referring to I1. Thus, when a memory management command is issued to a reference B picture, I pictures and P pictures can be decoded without breaking down the memory management even when IP playback is performed, by repeating the memory management command using DRPMR SEI to a P picture immediately after the reference B picture in decoding order. In particular, a use of the reference B picture is a significant characteristic of the MPEG-4 AVC, in the random access basis having a structure such as I B Br B P B Br B P B Br B P . . . , a quadruple-speed playback by decoding I and P pictures and a double-speed playback by decoding I, P and Br pictures can be easily realized so that functional capability of trick-play is increased. In such a case, it is very effective that memory management without a breakdown can be guaranteed. Here, when an I picture is in a position other than the beginning of the random access basis, the memory management command may be repeated in an I picture immediately after the I picture in decoding order using DRPMR SEI.

Here, the memory management command issued to the Br may be repeated in a picture which is different from a P picture or I picture immediately after the picture in decoding order if it is guaranteed that there is a picture referred by the picture is in the DPB when a picture is to be decoded at the IP playback. For example, in the case where the memory management is not broken down even without being repeated in the P picture immediately after the picture in decoding order, it may be transmitted to a P picture which follows the P picture. Also, it may be guaranteed that the memory management is not broken down when only the reference I pictures or P pictures are decoded.

Further, the memory management command may be stored in a coded stream by the information other than the DRPMR or may be separately indicated such as in database information.

Furthermore, it can be guaranteed that the memory management is not broken down also when trick-play other than IP playback is performed. Hereafter, it is explained about an example when jump-in playback is performed. A jump-in playback is an operation of displaying pictures starting from a picture at a specified time. When starting displaying pictures from a picture other than a leading picture in the random access unit, a picture necessary for decoding a picture to be displayed is decoded sequentially from a leading picture in the random access unit. Here, in MPEG-4 AVC, a reference relationship is flexible. Therefore, the decoding processing for the jump-in playback or reverse playback can be reduced by using a P picture in which a specific constraint is given for decoding or referring to a picture (hereafter referred to as Access Point (AP)-Picture). The AP-P picture has following two characteristics:

1. The AP-P picture can be decoded by selectively decoding I pictures or P pictures before the AP-P picture in the decoding order;
2. A picture after the AP-P picture in the decoding order does not refer to a picture before the AP-P picture in the decoding order.

FIG. 12A is a drawing showing pictures and a memory management command when the AP-P picture is used in the conventional technology. In the drawing, a picture shown as AP-P indicates an AP-P picture. In order to decode AP-P25, it is only needed to decode I1, P7 and P16 so that P4, P10, P13 and P22 may be skipped. Thus, by selectively decoding pictures, the number of pictures necessary for decoding the AP-P picture placed at some midpoint in the random access unit can be reduced. Consequently, the decoding processing when the playback is performed in the midpoint in the random access unit can be reduced. Also, a picture after the AP-P25 in the decoding order does not refer to a picture before the AP-P25 in the decoding order. Further, a P picture necessary to be decoded for decoding the AP-P picture can be indicated in a coded stream using a SEI message and the like or in database information. Here, if a memory management command MMCO1 which instructs to transfer I1 to a long term memory is stored in P4, the memory management command cannot be obtained when only a picture necessary for decoding the AP-P25 is decoded.

FIG. 12B is a drawing showing pictures and a memory management command when the AP-P picture is used in the first embodiment. As shown in FIG. 12B, by repeating a memory management command MMCO1 in P7 which is definitely decoded when the AP-P 25 is decoded, it is found that it is necessary to store I1 in a long-term memory when P7 is decoded. Thus, in the case where a memory management command is issued to a picture which is to be skipped when the AP-P picture is decoded, a memory management without a breakdown can be realized by repeating the memory management command in a P picture necessary for decoding the AP-P picture. Note that, if it can be guaranteed that the memory management is not broken down, the command may be repeated in the P picture that is not immediately after the P picture with the original memory management command but necessary for decoding the AP-P picture.

Further, more in general, when a picture necessary to be decoded for decoding a specific P picture is displayed, it may be guaranteed that memory management can be realized by decoding only pictures necessary to be decoded.

Figure 13:
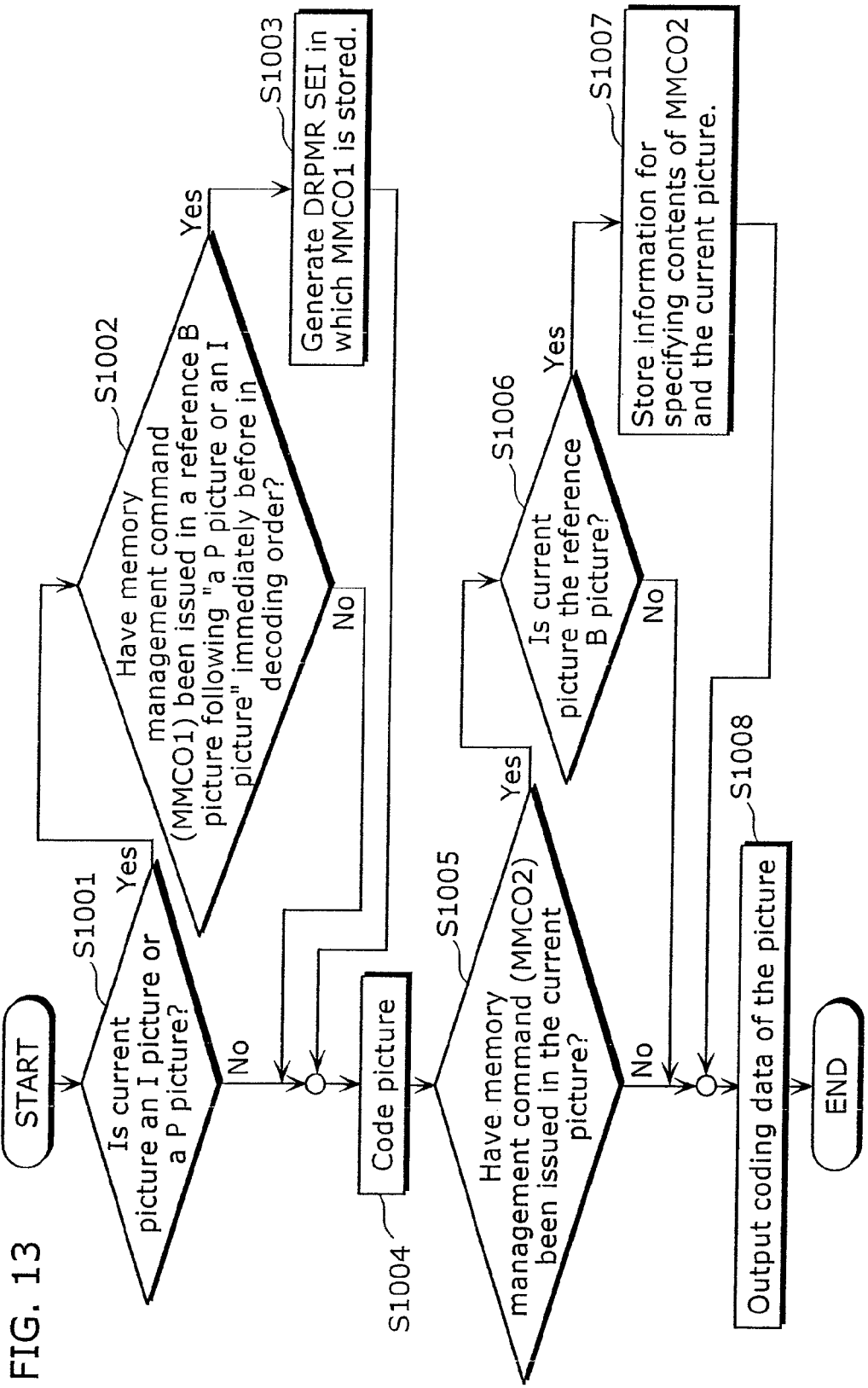
FIG. 13 is a flowchart showing a coding method for realizing memory management without causing a breakdown when I and P pictures are played back.

FIG. 13 is a flowchart of a coding method for generating a coded stream in which it is guaranteed memory management that is not broken down when the IP playback is performed. The processing from step S1001 to step S1008 shows a processing for coding one picture which constitutes a random access unit. First, in step S1001, it is judged whether a picture to be coded is an I picture or a P picture. If it is either the I picture or the P picture, the processing moves on to step S1002, and if it is not, the processing moves on to step S1004. In step S1002, it is judged whether a memory management command is issued to a reference B picture which follows a P picture or an I picture immediately before the picture to be coded in decoding order. In the case where the memory management command is issued, the processing moves on to step S1003, and moves on to step S1004 if the command is not issued. Here, in the case where there is no reference B picture immediately before the picture to be coded in decoding order in the random access unit such as a leading picture in the random access unit, it is judged that the command is not issued. Following that, in step S1003, a DRPMR SEI in which the memory management command is stored is generated. In the case where memory management commands are issued to a plurality of reference B pictures, the contents of all memory management commands are included in the DRPMR SEI. Next, in step S1004, the picture data is coded and the processing moves on to step S1005. In step S1005, it is judged whether or not a memory management command is issued to the current picture. If the command is issued, the processing moves on to step S1006, and moves on to step S1008 if the command is not issued. In step S1006, it is judged whether or not the current picture is the reference B picture. If the picture is the reference B picture, the processing moves on to step S1007, and moves on to step S1008 if it is not. In step S1007, the contents of the memory management command and information for specifying a picture to which the memory management command is issued are stored. Lastly, in step S1008, the coded data is outputted. Here, in the case where the DRPMR SEI is generated in step S1003, the output coded data includes DRPMR SEI. Note that, in the case where a picture type is not determined at the step S1001, the processing from the step S1001 to step S1003 may be performed after the step S1004. Further, the coded data of a picture may be outputted on a picture-by-picture basis, or may be outputted sequentially as the coding is completed.

Figure 14:
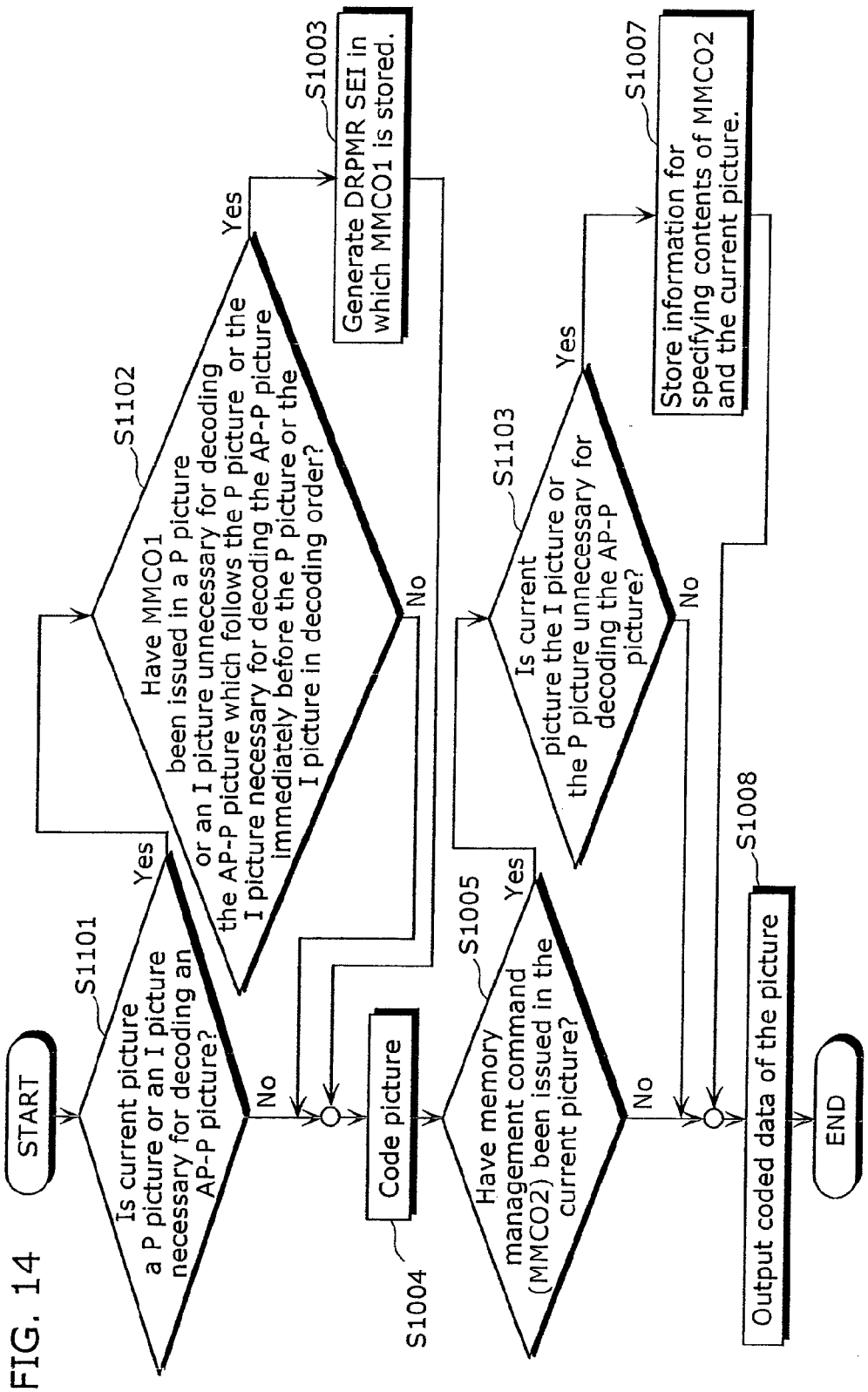
FIG. 14 is a flowchart showing a coding method for realizing memory management without causing a breakdown when AP-P picture is decoded.

FIG. 14 is a flowchart of a coding method for generating a coded stream in which memory management, that is not broken down when the AP-P is decoded, is guaranteed. While the fundamental processing is same as the processing for the IP playback shown in FIG. 13, it differs in the judgement processing in the steps S1101, S1102 and S1003. In the step S1101, it is judged whether or not the current picture is an I picture or a P picture necessary for decoding the AP-P picture. Next, in the step S1102, it is judged whether a memory management command is issued to a P picture or an I picture that follow the P picture or I picture necessary for decoding an AP-P picture immediately before the current picture in decoding order and is unnecessary for decoding the AP-P picture, within the random access unit. Also, in the step S1103, it is judged whether or not the current picture is the I picture or P picture unnecessary for decoding the AP-P picture.

Here, in the case where the AP-P picture can be decoded by selectively decoding only the P picture prior to the AP-P picture, only the P picture may be judged whether it is necessary for decoding the AP-P picture. However, in the case where it is necessary to decode an I picture that is a head of a random access unit, it may be indicated that decoding is necessary to be performed on the I picture.

Furthermore, the present method can be applied not only limited to the AP-P pictures but also to pictures in general on which a specific constraint is given to the predictive structure and the like.

Note that, by combining the processing shown in FIG. 13 and FIG. 14, memory management that is not broken down when the IP playback is performed and when the AP-P decoding is performed can be realized. For example, an operation such as decoding effectively a picture to be jumped-in using the AP-P and starting the IP playback from there can be realized.

Further, in the case where a picture that is needed to be decoded when trick-play is performed is indicated in supplemental information and the like, a memory management command may be repeated so as to obtain a memory management command necessary for decoding by decoding only pictures necessary for the decoding.

Figure 15:
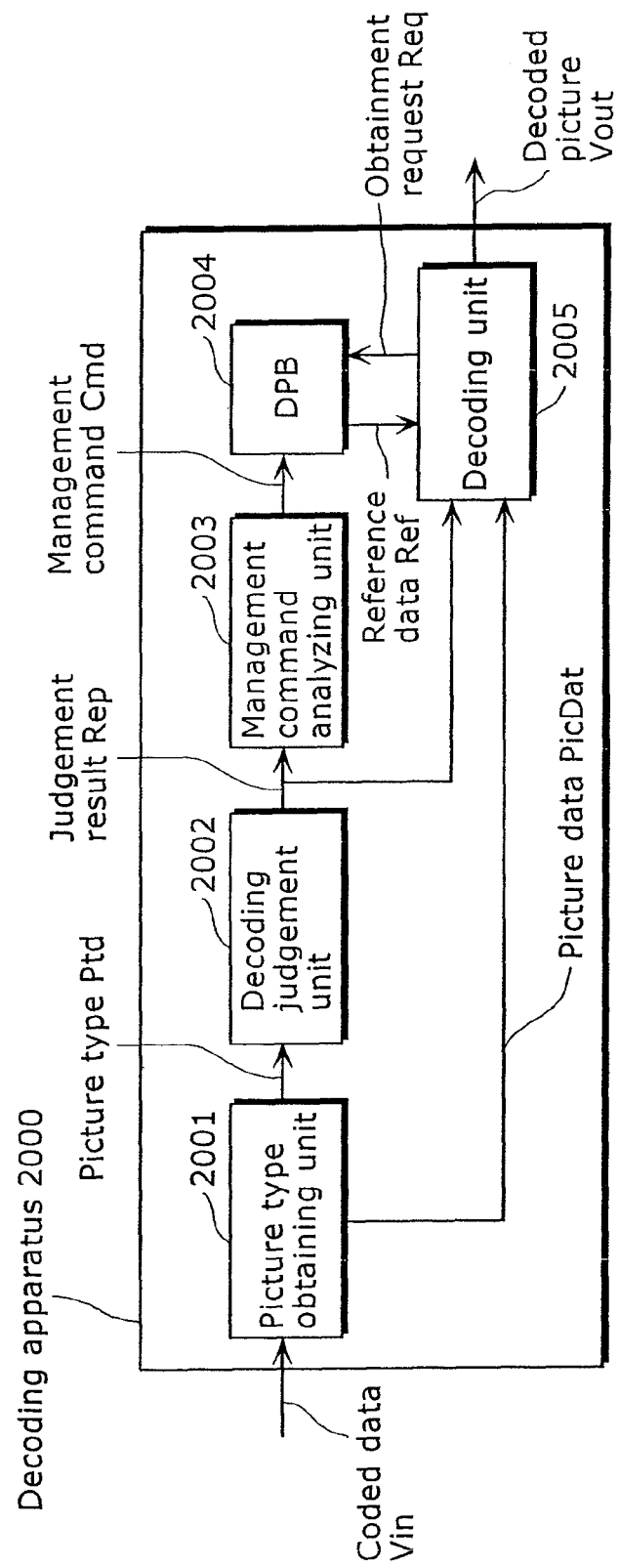
FIG. 15 is a block diagram showing a decoding apparatus which realizes a decoding method according to a sixth embodiment.

FIG. 15 is a block diagram showing a structure of a decoding apparatus 2000 in the present embodiment. The decoding apparatus 2000 includes a picture type obtaining unit 2001, a decoding judgement unit 2002, a management command analyzing unit 2003, a DPB 2004 and a decoding unit 2005. First, coded data Vin is inputted to the picture type obtaining unit 2001. The picture type obtainment unit 2001 obtains a picture type of a picture by detecting a picture boundary from the coded data Vin, and inputs the picture type Ptd into the decoding judgement unit 2002. The decoding judgement unit 2002 judges, based on the picture type Ptd, whether or not to decode the picture, and inputs the judgement result Rep into the management command analyzing unit 2003 and the decoding unit 2005. The management command analyzing unit 2003 executes memory management processing if a memory management command is repeated in picture data when it is instructed to decode the picture based on the judgement result Rep, by analyzing the repeated memory command (repetition information) and transmitting a management command Cmd to the DPB. The decoding unit 2005, when it is instructed to decode the picture based on the judgement result Rep, obtains the reference data Ref by issuing a request Req to obtain reference picture data to the DPB, decodes picture data PicDat obtained by the picture obtainment unit, and outputs the decoded picture Vout. Note that, an original memory command included in slice data of a picture shall be executed by a unit that is not shown in the diagram.

Note that, the supplemental information for specifying a picture needed to be decoded when trick-play is performed may be stored in a coded stream such as a leading AU of the random access unit or in database information. Here, the decoding judgement unit 2002 may determine an AU to be decoded by analyzing the supplemental information.

Figure 16:
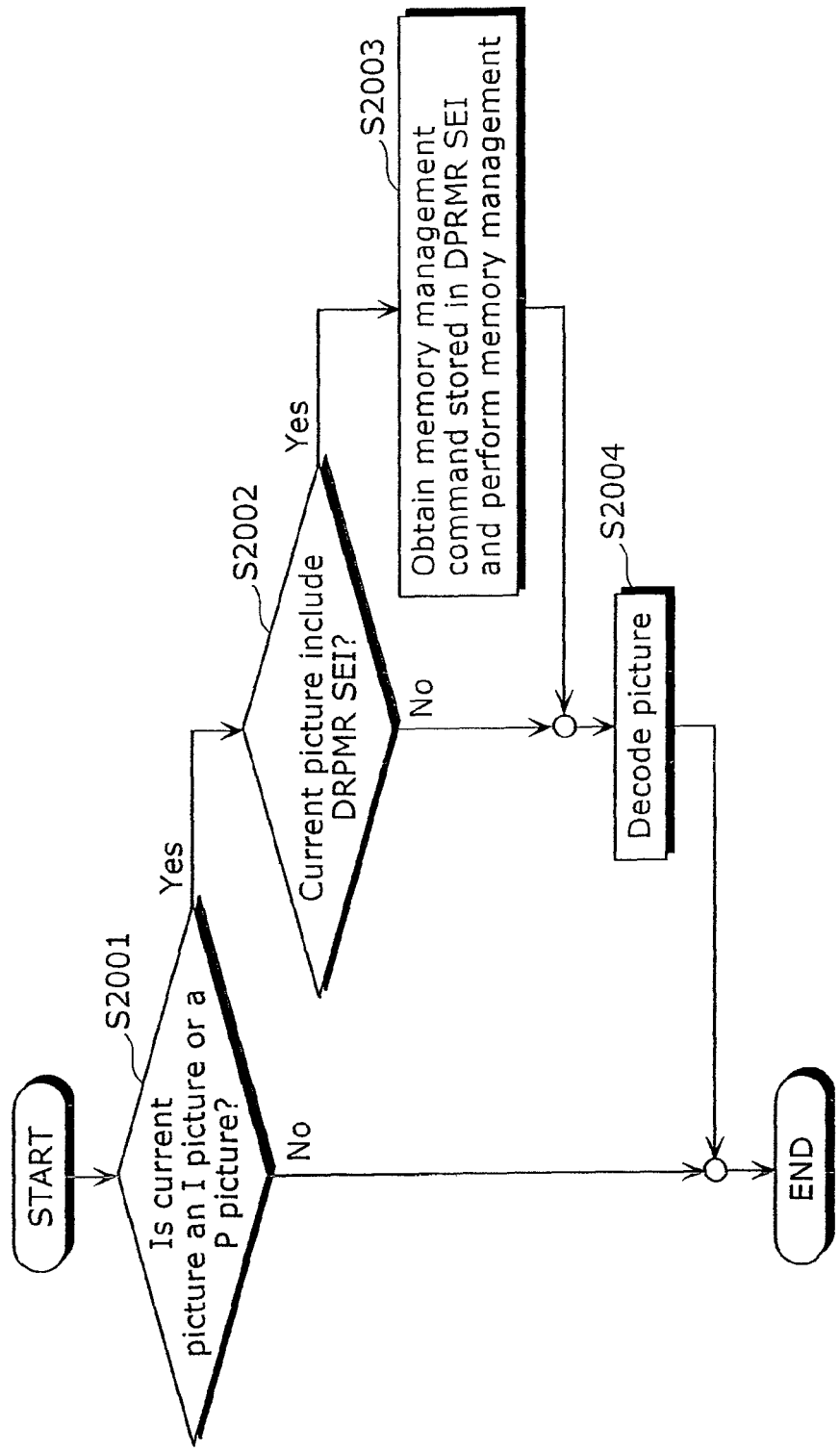
FIG. 16 is a flowchart showing a method of decoding a coded stream which is guaranteed that memory management without causing a breakdown can be realized when I and P pictures are played back.

FIG. 16 is a flowchart showing an operation of decoding a coded stream in which a memory management that is not broken down when IP playback is performed in the decoding apparatus 2000 is guaranteed. First, in step S2001, it is judged whether a picture to be decoded is an I picture or a P picture. When it is judged that the picture is either I picture or P picture, the operation moves on to step S2002. If the picture is other than the above, the processing of the picture is ended without decoding the picture and performs processing on the next picture. In step S2002, it is judged whether or not the current picture includes the DRPMR SEI, if it includes the DRPMR SEI, the operation moves on to S2003, and if it does not, the operation moves on to step S2004. In step S2003, the memory management processing is executed by analyzing the contents of the DRPMR SEI and the operation moves on to step S2004. In the step S2004, the picture is decoded. Note that, in the step S2003, memory management processing is not performed if it has already done by the preceding command that is in the slice header or in the DRPMR SEI.

Figure 17:
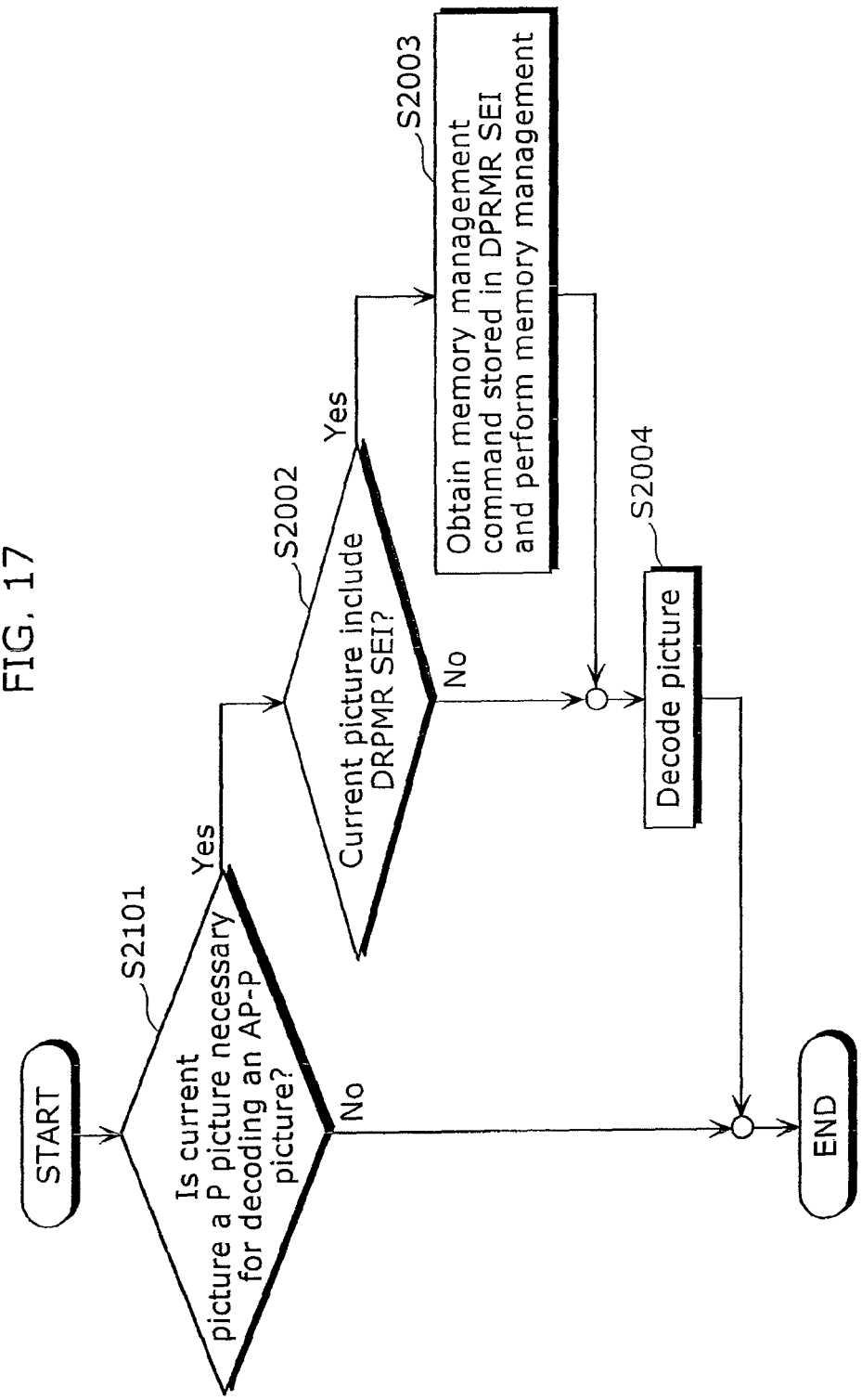
FIG. 17 is a flowchart showing a method of decoding a coded stream which is guaranteed that memory management without causing a breakdown can be realized when an AP-P picture is played back.

FIG. 17 is a flow chart showing an operation when an AP-P picture is decoded in a coded stream in which a memory management that is not broken down when the AP-P picture is decoded is guaranteed. While the fundamental processing is same as the processing when the IP playback is performed as shown in FIG. 16, it differs in judgement processing in step S2101. In step S2101, it is judged whether or not a picture to be decoded is a picture necessary for decoding the AP-P picture. If the picture is necessary for decoding the AP-P picture, the operation moves on to step S2002, and if it is not necessary, the processing on the picture is ended and the processing on the next picture is performed.

When the memory management command is repeated using a method other than the DRPMR SEI, a memory management command is obtained by a predetermined method.

Note that, by combining the processing shown in FIG. 16 and FIG. 17, a memory management that is not broken down when the IP playback is performed and when the AP-P playback is performed can be realized.

Here, in operations such as decoding only the I pictures and P pictures when the IP playback is performed, or skipping P pictures or I pictures unnecessary for decoding the AP-P picture when the AP-P picture is decoded, flag information which guarantees that a memory management command necessary for managing the DPB can be obtained from the picture to be decoded may be set to the database information or coded stream and the like. For example, in a Network Abstraction Layer (NAL) unit of a slice of the reference B picture, a value of a field called nal_ref_idc which indicates whether or not the slice is a slice of the reference picture is set to a value of one or more. In the non-reference B picture, the same field is set to 0. Accordingly the nal_ref_idc field may be flag information. Also, in the database information, a codec type information that shows MPEG-4 AVC and MPEG-2 Video and so on may be used as a flag.

Note that, in the above, it is explained about the MPG-4 AVC. However, a similar method can be applied to other coding methods.

Second Embodiment

Figure 18:
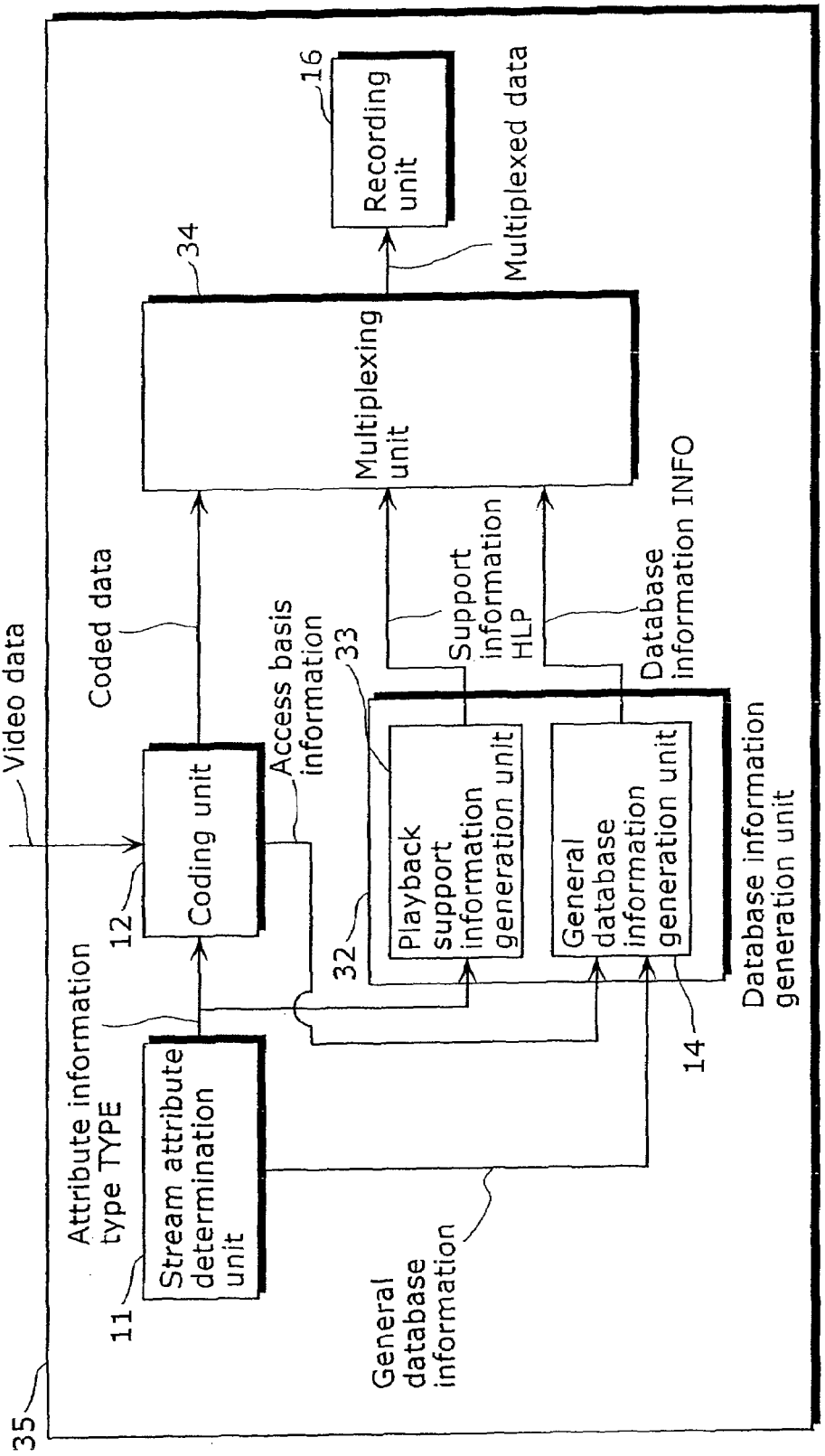
FIG. 18 is a block diagram showing a structure of a first multiplexer according to a second embodiment.

FIG. 18 is a block diagram showing a multiplexer in the present embodiment.

Figure 1:
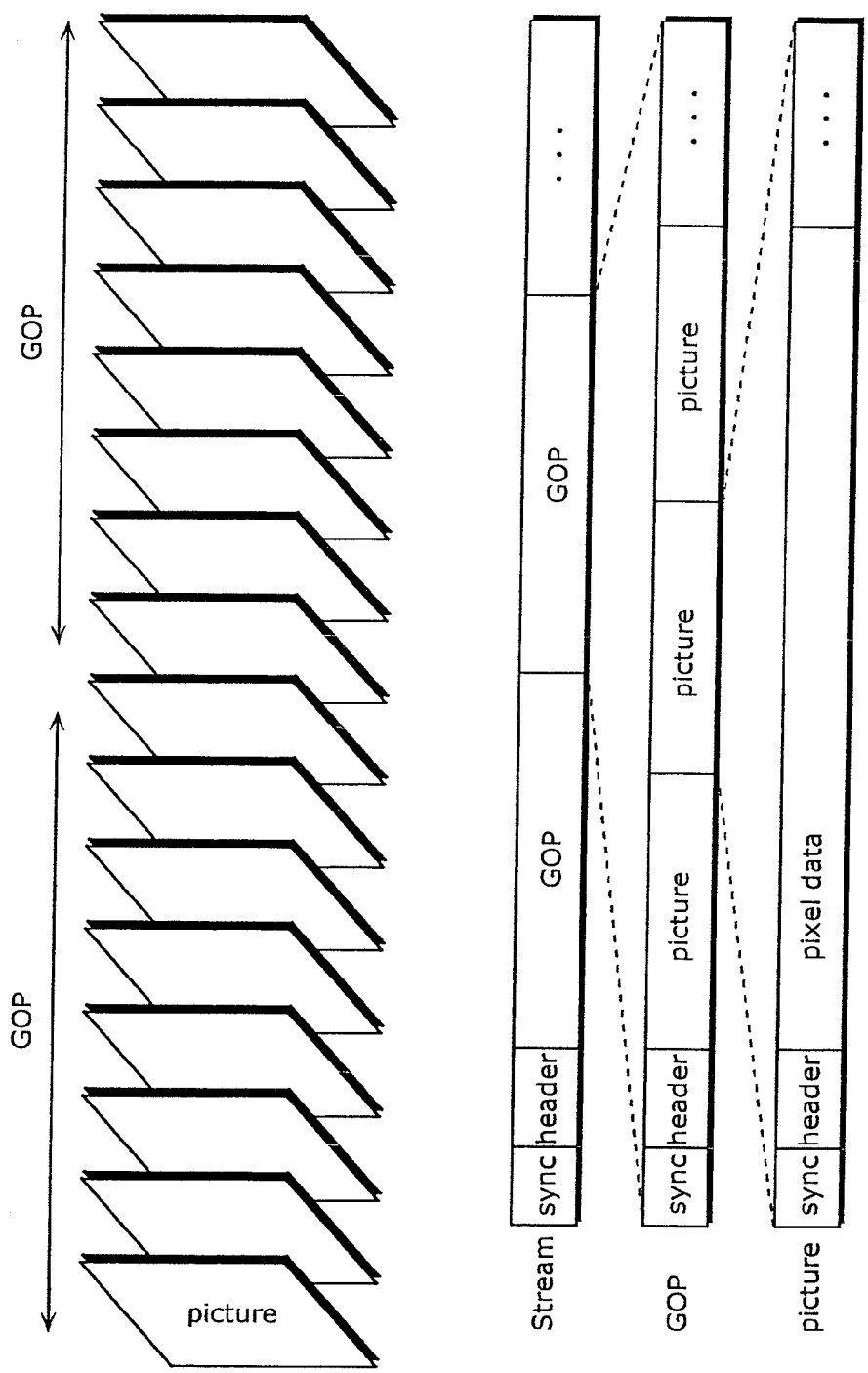
FIG. 1 is a drawing showing a stream structure in a MPEG-2 video.
Figure 3:
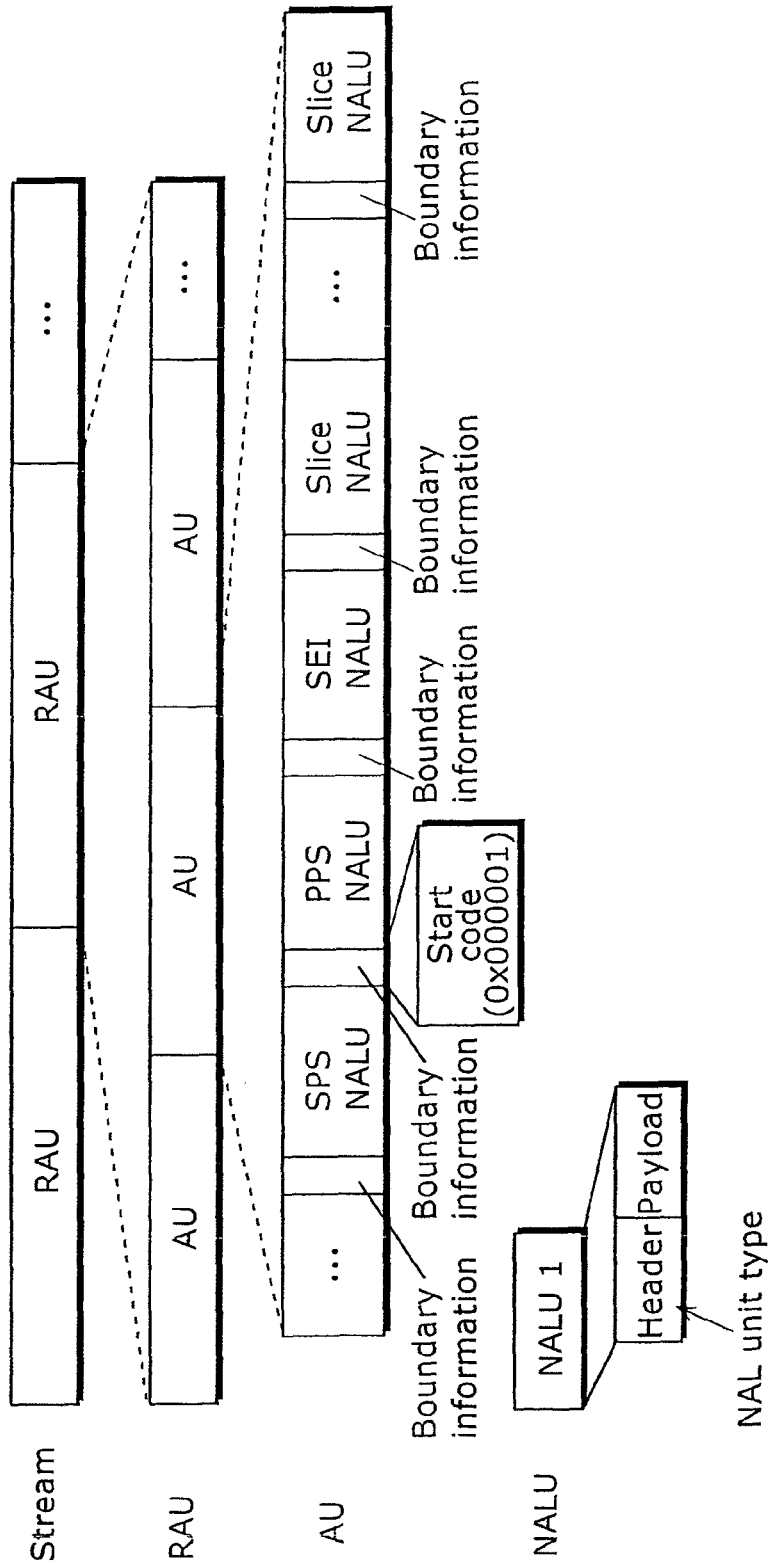
FIG. 3 is a drawing showing a stream structure of a MPEG-4 AVC.
Figure 4:
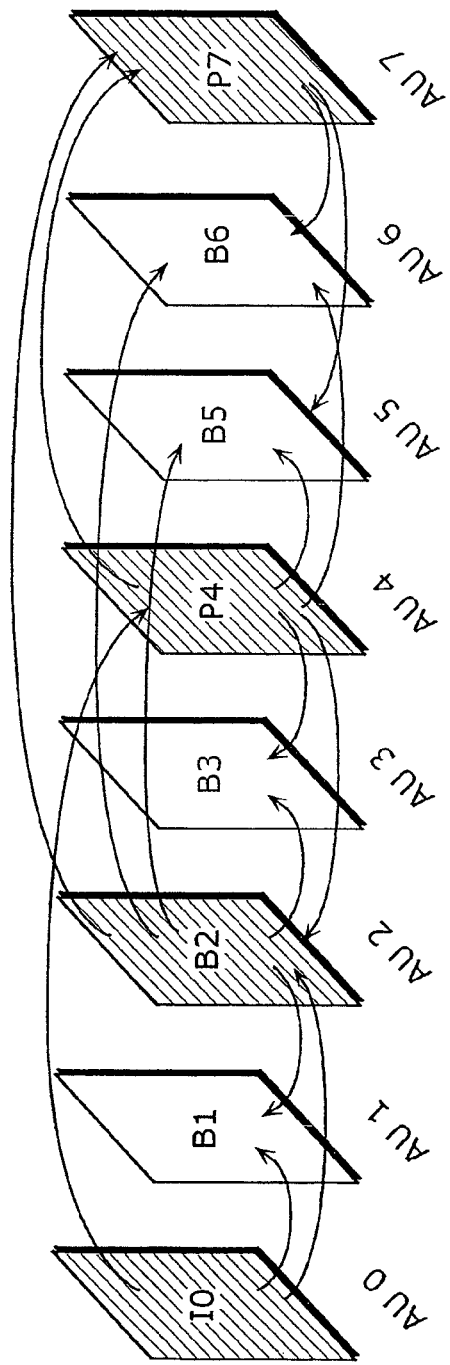
FIG. 4 is a drawing showing an example of a predictive structure of the MPEG-4 AVC.
Figure 5:
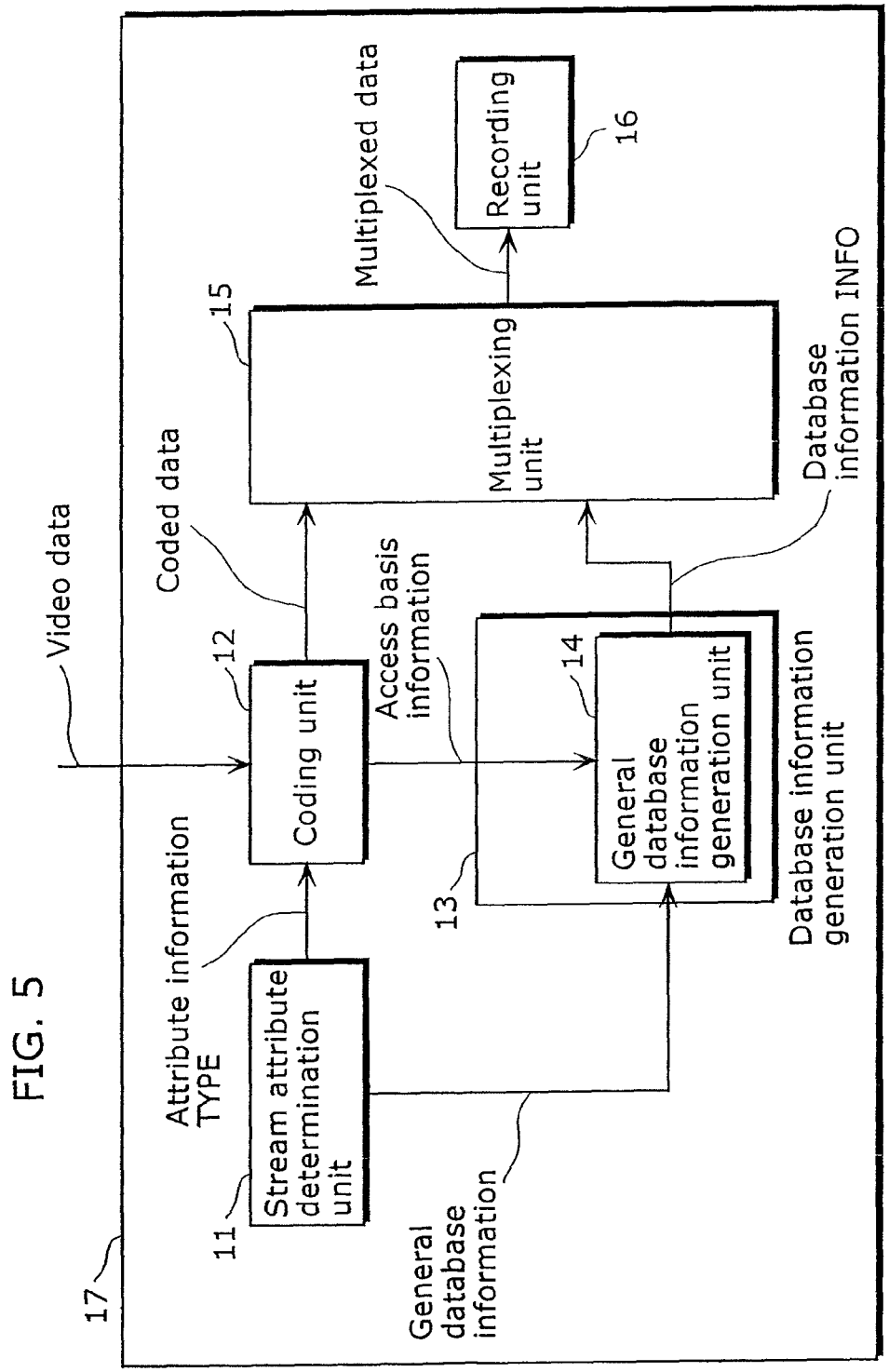
FIG. 5 is a block diagram showing a structure of a conventional multiplexer which codes a stream of the MEPG-4 AVC and multiplexes the coded stream.

A multiplexer 35 receives inputted video data, codes the inputted data into a stream of the MPEG-4 AVC, multiplexes and records the following information together with the stream: access information to AUs which constitutes the stream; and database information including supplemental information for determining an operation when trick-play is performed. The multiplexer 35 includes a stream attribute determination unit 11, a coding unit 12, a database information generation unit 32, a multiplexing unit 34, and a recording unit 16. Same marks are assigned to units which perform same operations as in the conventional multiplexer shown in FIG. 5, and the explanations about the same units are omitted in here. Note that, the coding method is not only limited to the MPEG-4 AVC and other methods such as MPEG-2 Video and MPEG-4 Video may be applied. Further, it may include a coding unit 1000 instead of the coding unit 12.

The stream attribute determination unit 11 determines a coding parameter for coding the MPEG-4 AVC and a constraint matter relating to the trick-play, and outputs these to the coding unit 12 and a playback support information generation unit 33 as attribute information TYPE. Here, the constraint matter relating to the trick-play includes information about whether or not to apply a constraint for constituting a random access unit in a stream of the MPEG-4 AVC stream, whether or not include information indicating AUs to be decoded or displayed when variable speed playback and reverse playback are performed, or whether or not to constrain predictive structure among AUs. The playback support information generation unit 33 generates, based on the inputted attribute information TYPE, support information HLP indicating whether or not to have a random access structure, and outputs the generated information to the multiplexing unit 34. The multiplexing unit 34 generates a multiplexed data by multiplexing the coded data inputted from the coding unit 12, database information INFO and support information HLP, and outputs the multiplexed data to the recording unit 16. Note that, the coding unit 12 may output the stream of the MPEG-4 AVC by packetizing into a MPEG-2 Transport Stream (TS), a Program Stream (PS) and the like. Or, it may packet the stream using a method defined by applications such as BD.

FIG. 19A and FIG. 19B show an example of information indicated in the support information HLP. The support information HLP has following two methods: a method of directly indicating information about a stream as shown in FIG. 19A; and a method of indicating whether or not the stream satisfies a constraint defined by a specific application standard as shown in FIG. 19B. In FIG. 19A, the followings are indicated as information of the stream: i) whether the stream has a random access structure; ii) whether there is a constraint on a predictive structure among pictures stored in an AU; and iii) whether there is information indicating an AU which is decoded or an AU which is displayed when trick-play is performed.

Here, the information of the AU which is decoded or displayed when the trick-play is performed may directly indicate the AU which is decoded or displayed, or may indicate priority of decoding or displaying. For example, information indicating AU which is decoded or displayed on a random access unit-by unit basis can indicate that it is stored in a NAL unit which has a special type defined by the application. Here, it may indicate whether there is information indicating a predictive structure among AUs which constitutes a random access unit. Further, information about AU to be decoded or displayed when trick-play is performed may be added together for each group of more than one random access units or may be added to each AU which constitutes a random access unit.

Furthermore, when the information indicating an AU to be decoded or displayed is stored in the NAL unit which has a special type, it may indicate a NAL unit type of the NAL unit. In an example of FIG. 20, in the support information HLP, information about an AU to be decoded or displayed when trick-play is performed is included in a NAL unit whose NAL unit type is 0. Herein, by separating the NAL unit whose NAL unit type is 0 from the AU data in the stream, information relating to the trick-play can be obtained.

Further, the constraint of the predictive structure may indicate whether or not to satisfy one or more predetermined constraint matters or whether or not to satisfy the following individual constraint.

i) The respective AUs of I picture and P picture have same decoding and displaying orders.

ii) The AU of the P picture does not refer to the AU of the B picture.

iii) An AU displayed after a leading AU in the random access unit only refers to AUs included in the random access unit.

iv) Each AU can only refer to the maxim N numbers of AUs in decoding order. Herein, an AU is counted for each reference AU or all AUs and the support information HLP may indicate the value of N.

Note that, in MPEG-4 AVC, in order to improve picture quality, a picture on which filtering (deblocking) for reducing block distortion is performed after decoding the picture is used as a reference picture, while a picture before the deblocking can be used as a picture for display. Herein, it is necessary for the picture decoding apparatus to store picture data before and after deblocking. Here, information indicating whether or not it is necessary to store the picture before deblocking as a picture for display may be stored in support information HLP.

Here, the support information HLP may include all of the above information or may include a part of the information. In addition, it may include necessary information based on a predetermined condition. For example, it may include information about whether there is trick-play information only in the case where there is no constraint on a predictive structure.

Further, the support information HLP may include information indicating the following: whether or not the IP playback can be realized without causing breakdown of the memory management by decoding only the I pictures and the P pictures; or whether or not the AP-P picture can be decoded without causing breakdown of the memory management by decoding only the I pictures or P pictures necessary for decoding the AP-P picture.

Further, information other than the above may be included in the support information HLP.

In FIG. 19B, the support information HLP shows not directly information relating to a structure of a stream but whether or not satisfy constraints relating to the stream structure defined by a HD DVD standard that is a standard for storing high precision picture of High Definition (HD) into a DVD. Furthermore, in an application standard such as BD-ROM, in the case where a plurality of modes are defined for the constraint on the stream structure, information indicating which mode is applied may be stored in the support information HLP. For example, it can be used that a mode 1 does not have constraints, and a mode 2 has a random access structure and information for specifying an AU which is decoded when trick-play is performed is included in a stream. Here, it may indicate whether or not to satisfy constraints defined in a communication service such as downloading and streaming, or broadcast standard.

Note that, the support information HLP may indicate both information shown in FIG. 19A and FIG. 19B. Also, in the case where it has been known that a stream satisfies a constraint in a particular application standard, it may not indicate about whether the stream satisfies an application standard, but store the constraint on the application standard by converting into a method of directly describing a stream structure as shown in FIG. 19A.

Here, in the case where information indicated in the support information HLP changes during the streaming, information of each section may be respectively stored. For example, in the case where different streams are edited and connected to each other, in the edited stream, the support information HLP may change during the streamlining. Therefore, the contents of the support information HLP are also switched.

Note that, the information indicating an AU to be decoded or displayed when trick-play is performed may be stored as database information.

Figure 21:
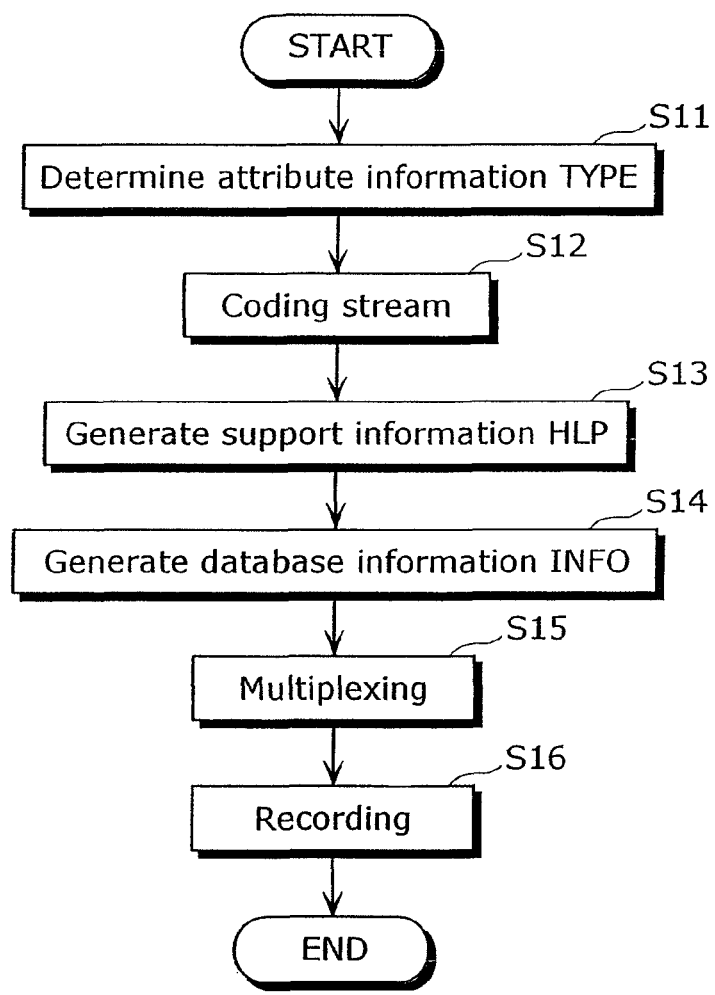
FIG. 21 is a flowchart showing an operation of the first multiplexer.

FIG. 21 is a flowchart showing an operation of the multiplexer 35. In a step s11, attribute information TYPE is determined based on a user setting or a predetermined condition. In a step s12, a stream is coded based on the attribute information TYPE. In a step s13, support information HLP is generated based on the attribute information TYPE. Following that, in a step s14, access information is generated for each access basis of the coded stream, and generates database information INFO together with other necessary information. In a step s15, the support information HLP and the database information INFO are multiplied, and the multiplexed data is recorded in a step s16. Here, the operation of the step s13 may be performed before the operation of step s12, or it may be performed after the operation of step s14.

Third Embodiment

Figure 22:
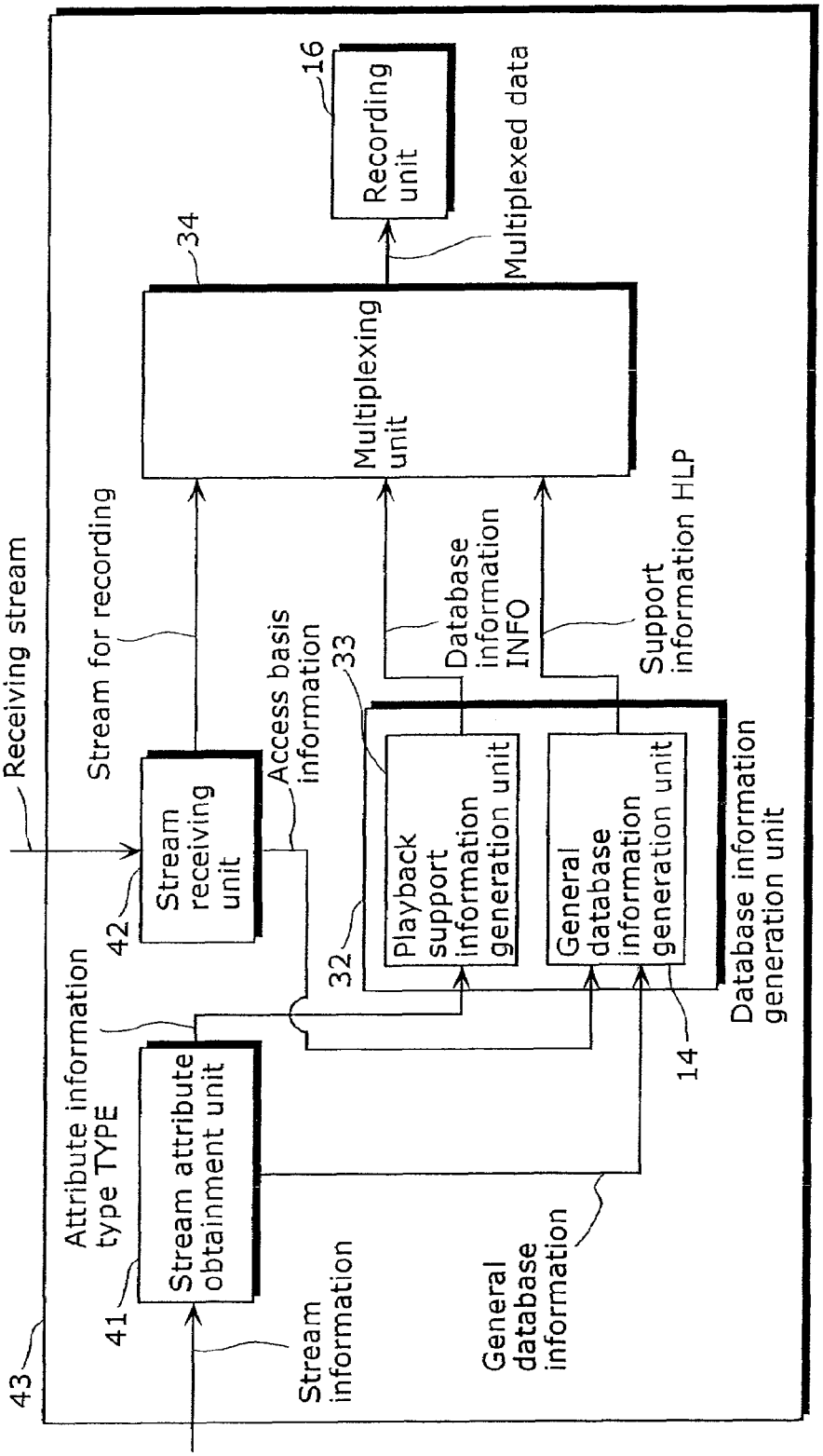
FIG. 22 is a block diagram showing a structure of a second multiplexer according to a third embodiment.
Figure 23:
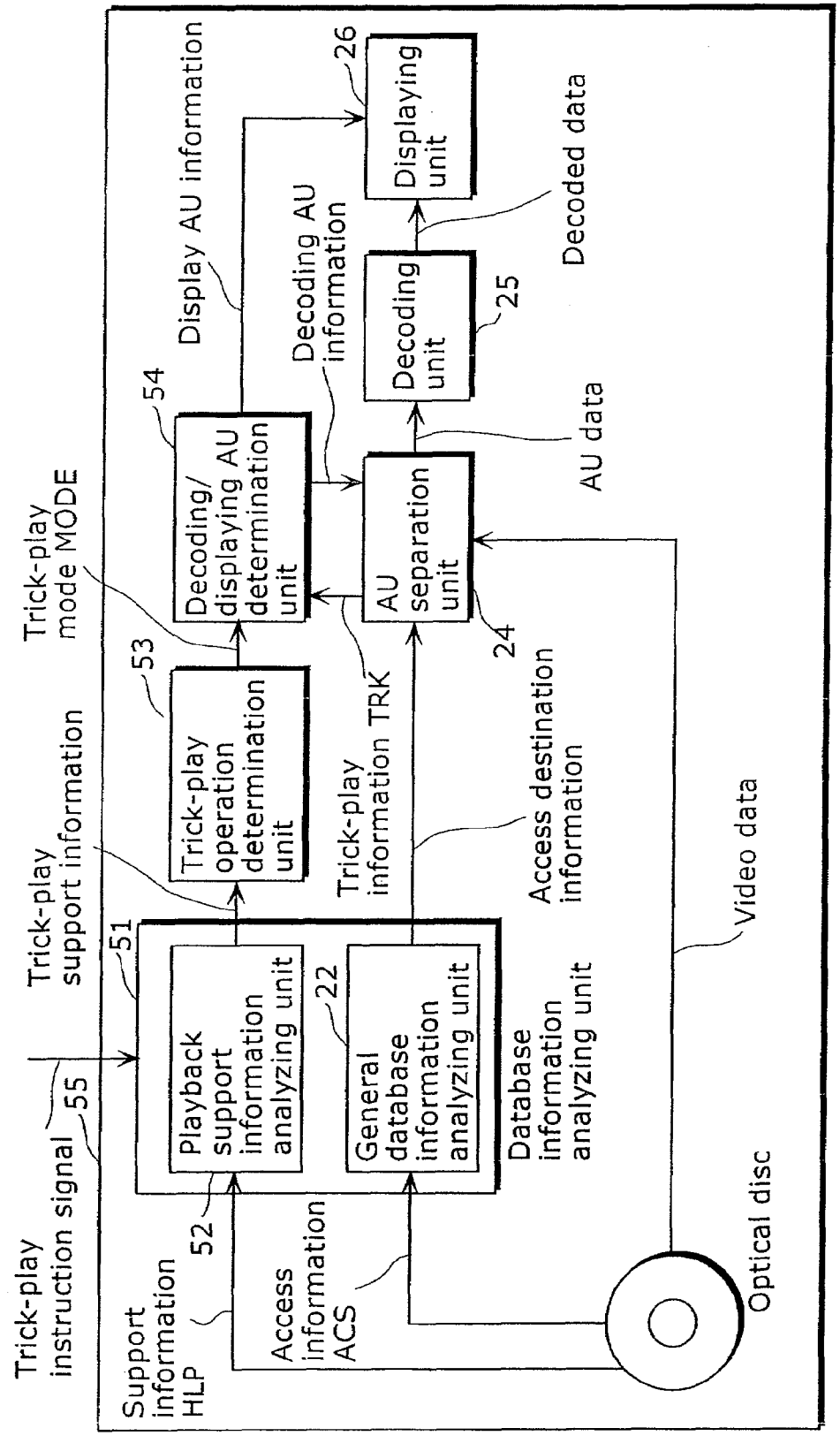
FIG. 23 is a block diagram showing a demultiplexer according to a fourth embodiment.

FIG. 22 is a block diagram showing a structure of a second multiplexer in the present embodiment.

A multiplexer 43 receives a packetized stream which is distributed from a server that is not shown in the diagram, multiplexes and records, together with the stream, general database information including access information to AUs that make up a stream and supplemental information for determining an operation when trick-play is performed. It includes a stream attribute obtainment unit 41, a stream receiving unit 42, a database information generation unit 32, a multiplexing unit 34, and a recording unit 16. Same marks are attached to units which perform same operations as units in the multiplexer explained in the second embodiment, and the explanations about same units are omitted in here.

The stream attribute obtainment unit 41 generates attribute information TYPE based on stream information obtained separately from the stream, and outputs the attribute information TYPE to the playback support information generation unit 33. Here, the stream information includes information relating to trick-play such as: whether or not to apply a constraint for constituting a random access unit in a stream of the MPEG-4 AVC; whether or not to include information indicating AUs to be decoded or displayed when variable speed playback and reverse playback are performed; and whether or not to give a constraint on a predictive structure between AUs. The stream receiving unit receives a stream of the MPEG-4 AVC, that is packetized by a MPEG-2 Transport Stream (TS) and a Real-time Transmission Protocol (RTP), outputs the received stream to the multiplexer 34 as a stream for recording, and also outputs the access information to the general database information generation unit 14.

Here, when the TS packet, RTP packet and the like are received in an environment where packet loss is generated, in the case where error concealment processing is performed when information and data indicating that data in a stream is lost because of the packet loss, the HLP may store information about that as support information. As information indicating the loss of data, the following information can be shown: flag information indicating whether or not data in a stream is lost; information indicating to insert a special error notification code into a stream in order to notify the lost part; or identification information of an error notification code to be inserted.

Fourth Embodiment

FIG. 22 is a block diagram showing a structure of a demultiplexer in the present embodiment.

Figure 6:
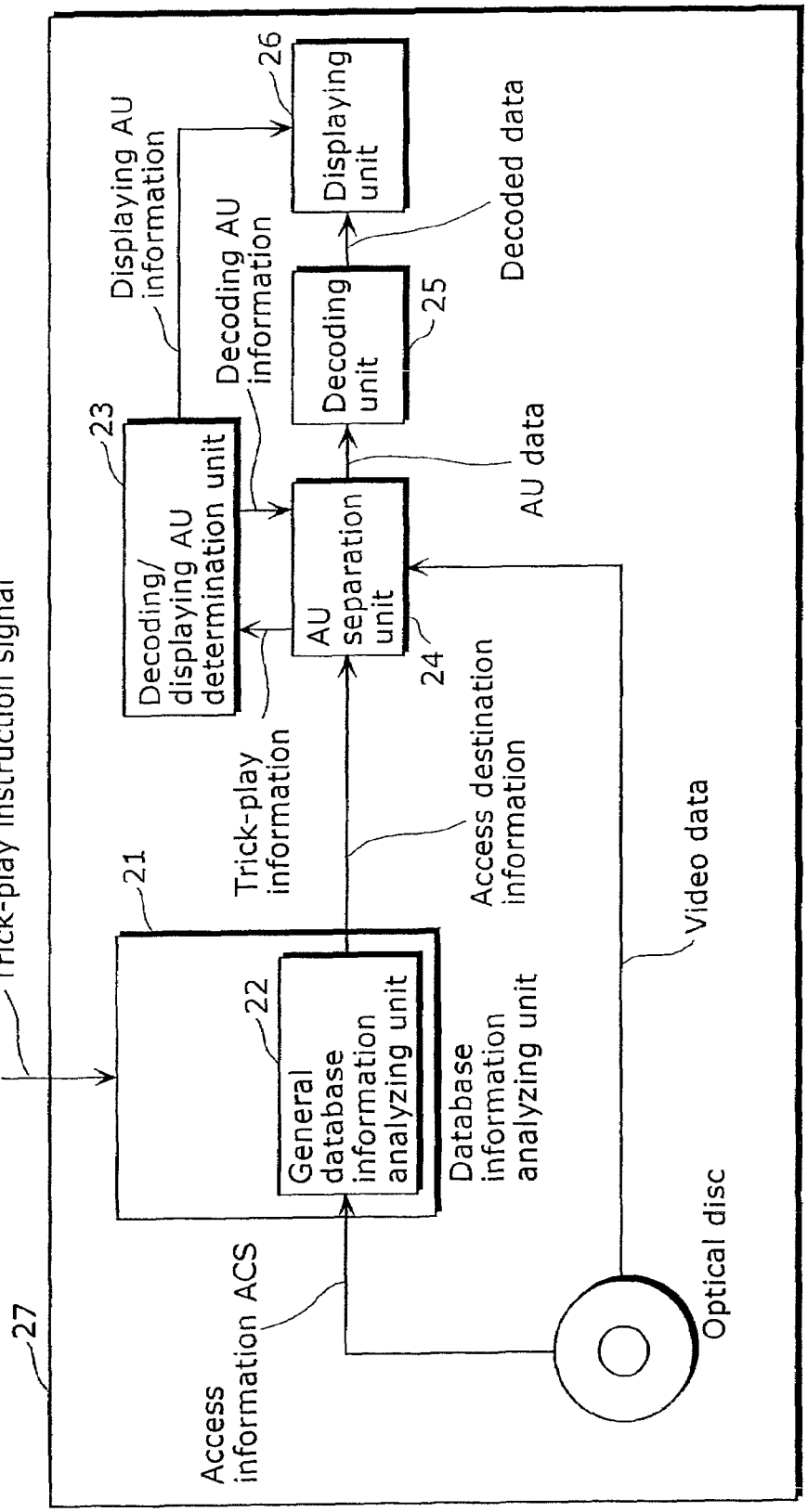
FIG. 6 is a block diagram showing a structure of a conventional demultiplexing apparatus which plays back multiplexed data generated by the conventional multiplexer.
Figure 7A:
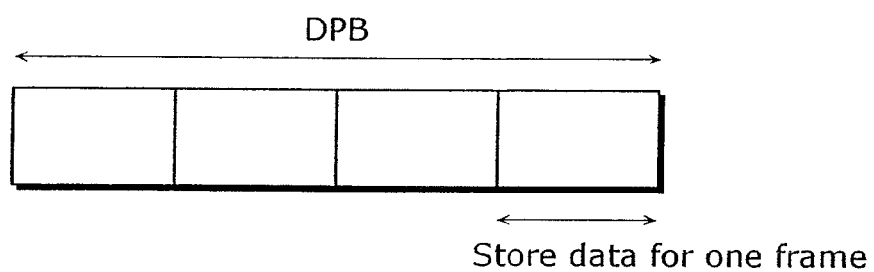
FIG. 7A and FIG. 7B are drawings indicating memory management in a decoded picture/buffer in the MPEG-4 AVC.
Figure 7B:
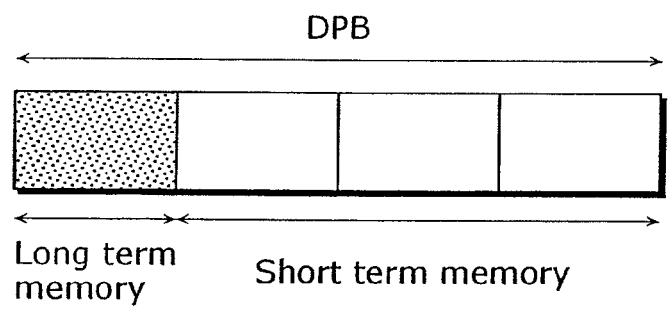

A demultiplexer 55 separates a MPEG-4 AVC stream from the multiplexed data generated by the multiplexers explained in the second and third embodiments, and plays back the separated MPEG-4 AVC. It includes a database information analyzing unit 51, a trick-play operation determination unit 53, a decoding/displaying AU determination unit 54, an AU separation unit 24, a decoding unit 25, and a displaying unit 26. Here, same marks are attached to the units which perform same operations as the units in the conventional demultiplexer shown in FIG. 6 and the explanations about the same units are omitted.

The database information analyzing unit 51 includes a playback support information analyzing unit 52 and a general database information analyzing unit 22. The playback support information analyzing unit 52, when a trick-play instruction signal is inputted, obtains and analyzes support information HLP from the database information in the multiplexed data, generates trick-play support information based on the analysis result, and notifies the trick-play operation determination unit 53 of the trick-play support information. The trick-play operation determination unit 53 determines a method of determining an AU to be decoded and displayed when the trick-play is performed based on the trick-play support information, and notifies the decoding/displaying AU determination unit 54 of a trick-play mode indicating the determined method. The decoding/displaying AU determination unit 54 analyzes the trick-play information TRK obtained by the AU separation unit 24, determines an AU to be decoded and displayed by a method indicated by the trick-play mode MODE, and notifies the AU separation unit 24 and the displaying unit respectively of identification information of the AU to be decoded and identification information of the AU to be displayed. Here, the AU to be displayed may be determined by the decoding/displaying AU determination unit 54 based on a specified playback speed and the like. Further, when the trick-play information TRK is stored in the database information, the trick-play information TRK stored in the database information may be obtained by setting another unit in the database information analyzing unit 51.

Figure 24:
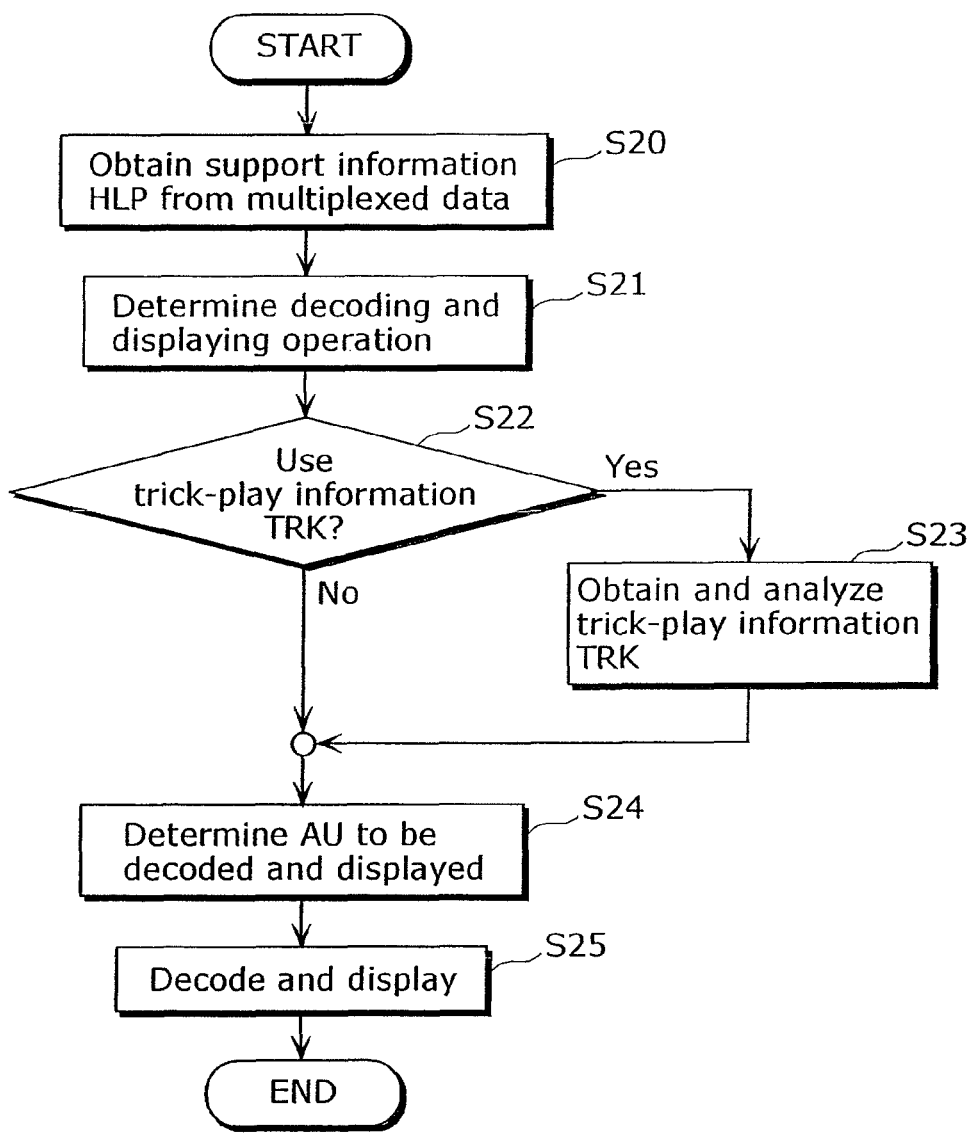
FIG. 24 is a flowchart showing a first operation of the demultiplexer.

FIG. 24 is a flowchart showing operations of the demultiplexer 55. When a trick-play instruction signal is inputted, it obtains support information HLP from the multiplexed data in step s20. In a step s21, an operation of determining an AU to be decoded and displayed based on the obtained support information HLP. In a step s22, it is judged whether or not it is determined to use the trick-play information TRK when the trick-play is performed. In a step s23, the trick-play information TRK is obtained from the stream and analyzed, and the operation moves on to a step s24. If the trick-play information TRK is not used, the operation moves on directly to the step s24. In the step s24, an AU to be decoded and displayed is determined based on the method determined in the step s21, and the operation moves on to a step s25. In the step s25, the determined AU is decoded and displayed. Note that, the support information HLP may be obtained only in the case where the trick-play is performed when the playback is started or after the playback is started.

Figure 25:
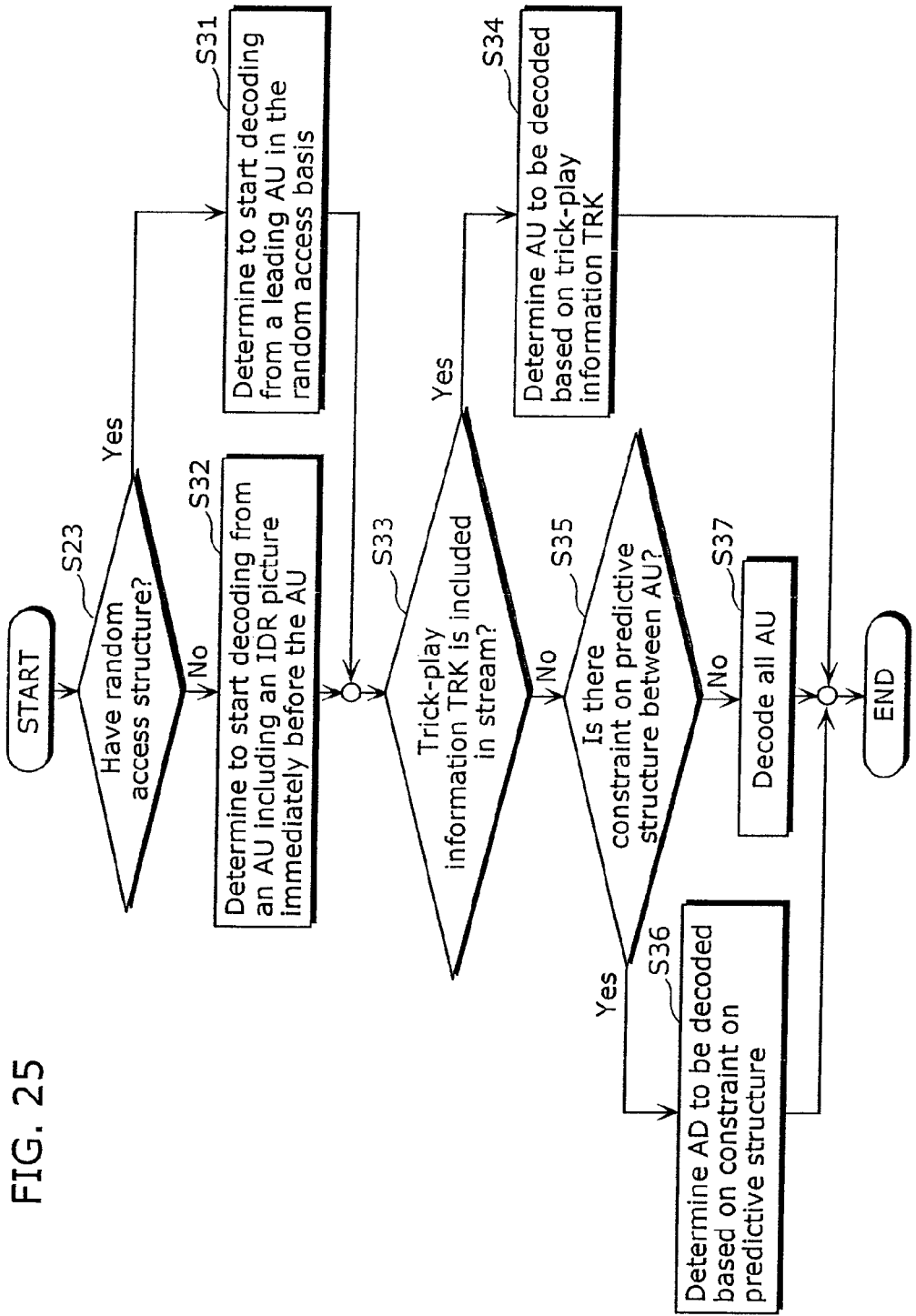
FIG. 25 is a flowchart showing a second operation of the demultiplexer.

FIG. 25 is a flowchart showing contents of the processing in the step s21. Hereafter, judging in steps s30, s33, and s35 are performed based on the trick-play support information obtained from the support information HLP. In the step s30, it is judged whether or not the stream has a random access structure, the operation moves on to the step s31 if the stream has a random access structure, and the operation moves on to the step s32 if the stream does not have the random access structure. Then, respective AU to be decoded is determined. In the step s31, it is determined to start decoding from a leading AU in the random access unit. In the step s32, it is determined to start decoding from the AU when the leading AU in the random access unit is an AU of an IDR picture, the decoding is started from the AU. Here, in the case where a display time of an AU including the preceding IDR picture is before a predetermined time or more, an AU to be coded first may be determined based on a predetermined rule such as starting decoding of an leading AU in N preceding access basis or an I picture other than the IDR. In the step s33, it is judged whether or not the trick-play information TRK is included in the stream. If the TRK is included, the operation moves on to a step s34, and if the TRK is not included, the operation moves on to a step s35. In the step s34, the processing is ended by determining an AU to be decoded or displayed based on the trick-play information TRK. In the step s35, it is judged whether or not there is a constraint on the predictive structure between AUs. If there is a constraint, the operation moves on to a step s36, and if there is no constraint, the operation moves on to a step s37. In the step s36, the processing is ended by determining that only an AU which needs to be decoded when decoding the AU which is necessary to be displayed when variable speed playback and reverse playback are performed based on the constraint on the predictive structure. Also, in the step s37, the processing is ended by determining that all AUs are decoded. Consequently, a method of determining an AU to be decoded first is determined as the results of the steps s31 and s32, and a method of specifying an AU to be decoded when the variable speed playback or trick-play is performed as the results of the steps s34, s36 and s37. Then, they are outputted to the decoding/displaying AU determination unit 54 as information of the respective trick-play modes MODE. Note that, when a jump-in playback is performed, the processing may be ended after the step 32 or the step s31. Here, as a method of determining an AU to be decoded when the trick-play is performed, a predetermined method may be used: for example, in the case where it is judged that the trick-play information TRK is not included in the stream in the step s33, only AUs of I pictures and P pictures are decoded, or only AUs of I pictures, P pictures, and B pictures to be referred are decoded.

Note that, in the case where information for determining an AU to be displayed is included in the trick-play information TRK, information indicating to determine an AU to be displayed based on the trick-play information TRK may be included in the trick-play mode MODE.

Here, in the case where decoding by a method determined by the trick-play operation determination unit 53 cannot be realized, an AU to be decoded by a predetermined method may be determined. For example, in the case where it is indicated to obtain the playback information TRK from the coded stream by the trick-play mode MODE, if the trick-play information TRK cannot be obtained in the coded stream, all AUs are decoded or AUs to be decoded can be determined based on other information obtained from the support information HLP. Herein, it may be verified about whether the database information includes the trick-play information TRK.

Here, in the case where information other than the trick-play related information is included in the support information HLP, a decoding or displaying operation may be switched according to the information. For example, the operations may be switched based on packet loss information when data received through broadcast and communication is recorded.

Further, a medium on which the multiplexed data is recorded is not only limited to an optical disc but it may be other recording mediums such as a hard disc and a nonvolatile memory.

Furthermore, operations of the decoding/displaying AU determination unit 23 differ from each other. By preparing conventional demultiplexers shown in FIG. 6, a demultiplexer to be used may be switched based on a trick-play mode determined by separately set playback support information analyzing unit 52 and trick-play operation determination unit 53. For example, any two out of the conventional demultiplexers having the decoding/displaying AU determination units 23 which perform the following three types of operations are prepared, and may switch the demultiplexer to be used based on the support information HLP of the multiplexed data to be played back. The three types are: i) to determine a demultiplexer so as to decode all AUs all the time; ii) to obtain the trick-play information TRK all the time and determine an AU to be decoded; and iii) to determine an AU to be decoded by presuming that a stream follows a specific predictive structure.

Fifth Embodiment

As a method of recording multiplexed data onto an optical disc by a multiplexer according to the second embodiment, it is explained about a method of storing support information HLP as database information of a BD that is a next generation optical disc.

First, it is explained about a recording format of a BD-ROM.

Figure 26:
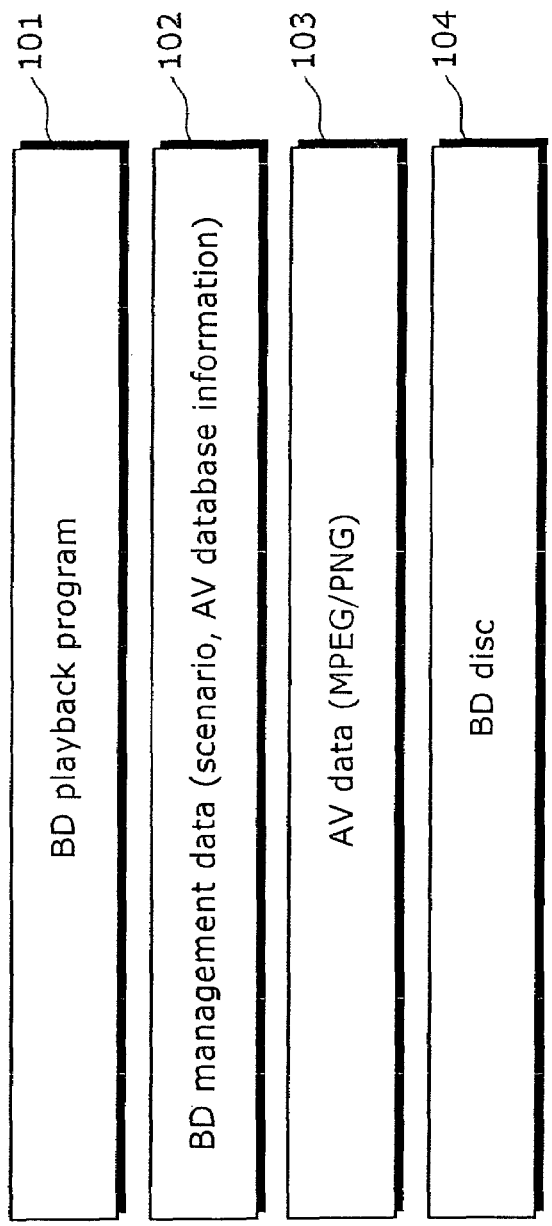
FIG. 26 is a diagram showing data hierarchy of HD-DVD according to a fifth embodiment.

FIG. 26 is a diagram showing a structure of a BD-ROM, in particular a structure of a BD disc (104) that is a disc medium and data (101, 102, and 103) recorded on the disc. The data to be recorded on the BD disc (104) are AV data (103), BD database information (102) such as database information relating to the AV data and AU playback sequence, and a BD playback program (101) for realizing an interactive. In the present embodiment, it is explained about a BD disc mainly for an AV application for playing back AV contents in a movie for the purpose of explanation. However, there is no doubt that it is same even if it is used for other uses.

Figure 27:
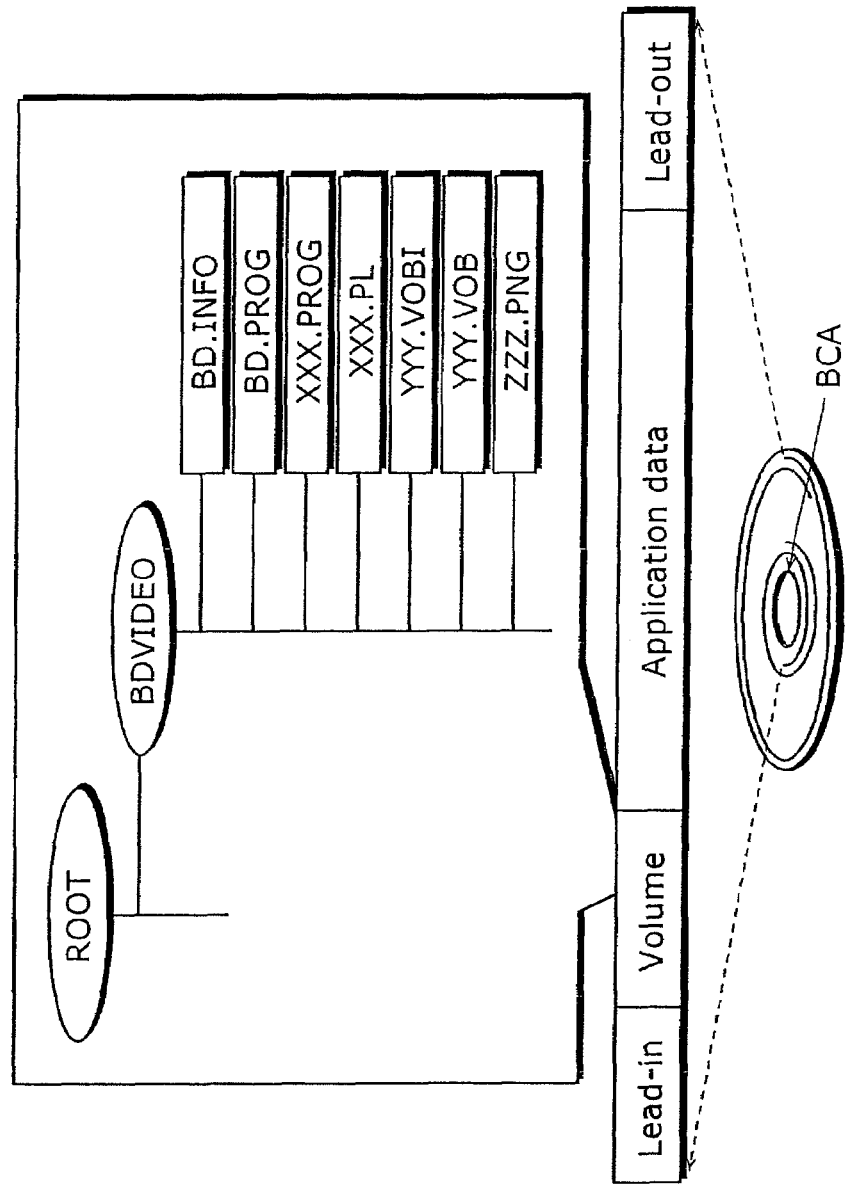
FIG. 27 is a diagram showing a structure of logical space on the HD-DVD.

FIG. 27 is a diagram showing a directory/file structure of logical data recorded on the BD disc. The BD disc has a recording area in a spiral form from the inner radium toward the outer radius as similar to, for example, DVD, CD and the like, and has a logical address space in which logical data can be recorded between a lead-in of the inner radium and a lead-out of the outer radium. Also, there is a special area inside the lead-in which is read only by a drive called a Burst Cutting Area (BCA). This area cannot be read from the application so that it may be used, for example, for a copyright protection technology and the like.

In the logical address space, application data such as video data lead by the final system information (volume) is recorded. As explained in the conventional technology, the file system is a UDF, an ISO96660 and the like. It allows reading out logical data stored as in the ordinal personal computer PC, using a directory and a file structure.

In the present embodiment, as the directory and file structure on the BD disc, a BDVIDEO directory is placed immediately under a root directory (ROOT). In this directory, data (101, 102 and 103 explained in FIG. 26) such as AV contents and database information dealt in the BD are stored.

Under the BDVIDEO directory, the following seven types of files are recorded:

BD. INFO (file name fixed)

A file that is one of "BD database information" and information concerning the BD disc as a whole is recoded in the file. A BD player firstly reads out this file.

BD. PROG (file name fixed)

A file that is one of "BD playback program" and playback control information concerning the BD disc as a whole is recorded in the file.

XXX. PL ("XXX" is variable, an extension "PL" is fixed)

A file that is one of "BD database information" and play list information that is a scenario (playback sequence) is recorded in the file. There is one file for each play list.

XXX. PROG ("XXX" is variable, an extension "PROG" is fixed)

A file that is one of "BD playback program" and playback control information for each play list is recorded in the file. A correspondence with a play list is identified by a file body name ("XXX" matches).

YYY. VOB ("YYY" is variable, an extension "VOB" is fixed)

A file that is one of "AV data" and VOB (same as VOB explained in the conventional example) is recorded in the file. There is one file for each VOB.

YYY. VOBI ("YYY" is variable, an extension "VOBI" is fixed)

A file that is one of "BD database information" and stream database information concerning VOB that is AV data is recorded in the file. A correspondence with a VOB is identified by a file body name ("YYY" matches).

ZZZ. PNG ("ZZZ" is variable, an extension "PNG" is fixed)

A file that is one of "AV data" and image data PNG (a picture format standardized by W3C, and pronounced as "ping") for structuring subtitles and a menu in the file. There is one file for each PNG image.

With references to FIGS. 28 to 32, it is explained about a structure of navigation data of BD (BD database information).

Figure 28:
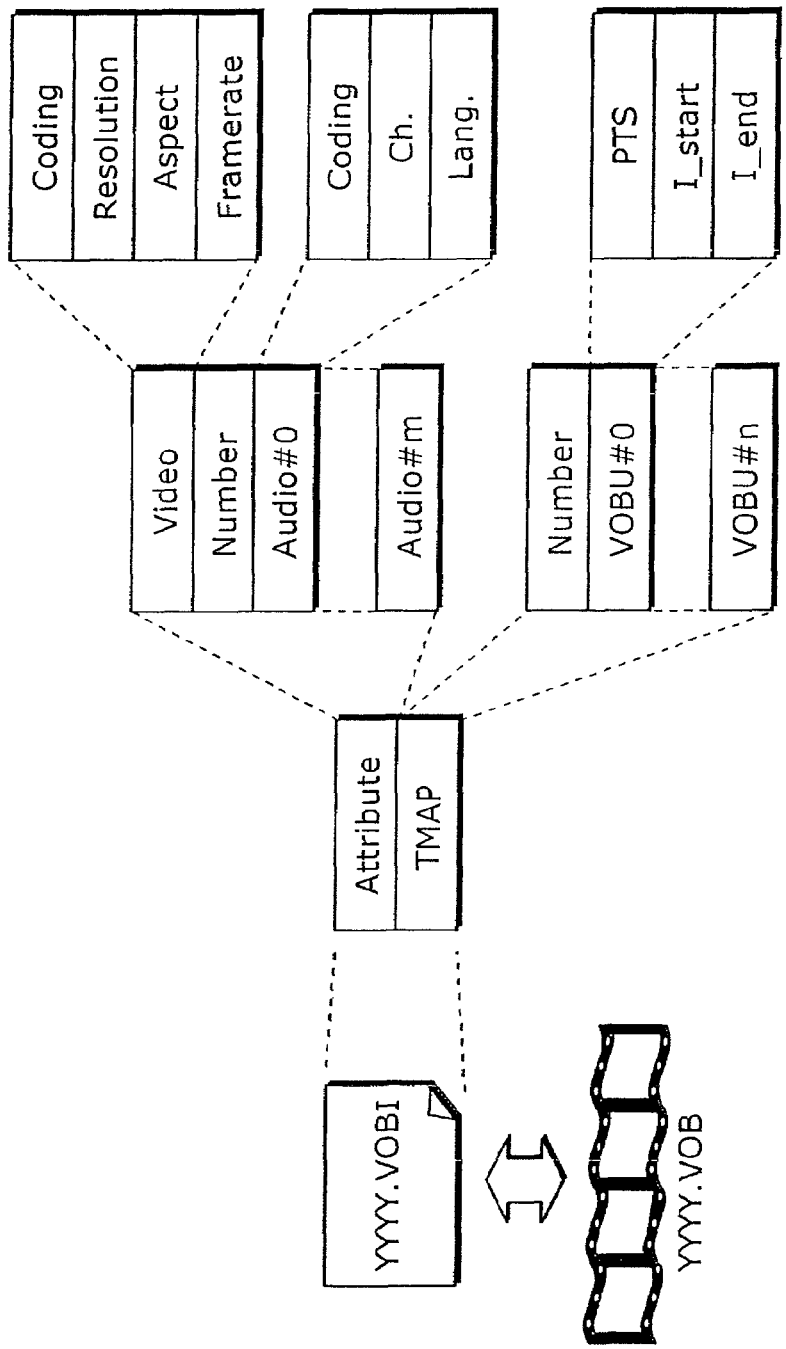
FIG. 28 is a diagram showing structure of a VOB information file.

FIG. 28 is a diagram showing an internal structure of a VOB database information file ("YYY. VOBI").

The VOB database information has stream attribute information (Attribute) of the VOB and a time map (TMAP). There is a stream attribute for each of video attribute (Video) and audio attribute (Audio #01 to Audio #m). In particular, in the case of the audio stream, since the VOB can have audio streams at the same time, the number of audio streams (Number) indicates whether there is a data field or not.

The followings indicate fields of video attribute (Video) and values thereof.

Compression method (Coding):
MPEG1
MPEG2
MPEG3
MPEG4 (Advanced Video Coding)
Resolution:
1920×1080
1440×1080
1280×720
720×480
720×565
Aspect Rate
4:3
16:9
Framerate
60
59.94 (60/1.001)
50
30
29.97 (30/1.001)
25
24
23.976 (24/1.001)

The followings are fields of the audio attribute (Audio) and values thereof.

Compression method (Coding):
AC3
MPEG1
MPEG2
LPCM
The number of channels (Ch):
1 to 8
Language Attribute (Language)

A time map (TMAP) is a table having information for each VOBU. The table includes the number of VOBU (Number) held by the VOB and each VOBU information (VOBU #1 to VOBU #n). Each of the VOBU information is made up of an address I start of an address of a VOBU leading TS packet (I picture start), an offset address (I #end) until the end address of the I picture, and a playback start time (PTS) of the I picture. In the case where a stream of the MPEG-4 AVC has a random access structure, a VOBU corresponds to one or more random access units.

Figure 29:
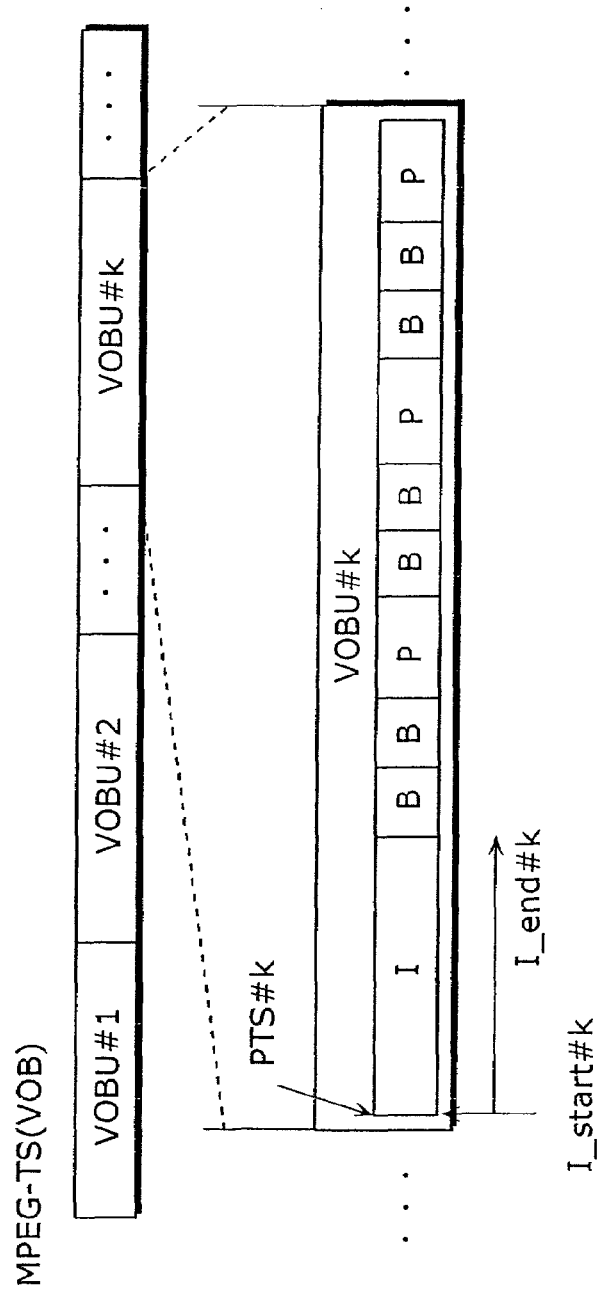
FIG. 29 is explanatory drawing of a time map.

FIG. 29 is a diagram explaining details of the VOBU information.

As widely known, there is a case that MPEG video stream is compressed into variable bit rate in order to recording in high picture quality, and there is no simple correspondence between the playback time and the data size. In contrary, an AC3 that is a compression standard of audio compresses audio in a fixed bit rate. Therefore, a relationship between a time and an address can be obtained by a primary expression. However, in the case of a MPEG video data, each frame has a fixed display time, for example, in the case of NTSC, one frame has a display time of 1/29.97 seconds. However, data size of each compressed frame largely changes depending on a characteristic of a picture and a picture type used for compression, specifically I/P/B pictures. Therefore, in the case of MPEG video, a relationship between time and address cannot be described in a primary expression.

As a matter of fact, it is impossible to describe a MPEG system stream which is obtained by multiplexing the MPEG video data in a form of a primary expression. Specifically, VOB also cannot describe time and data size in a primary expression. Therefore, a time map (TMAP) is used for connecting a relationship between time and address in the VOB.

Therefore, when time information is given, first, it is searched in which VOBU the time belongs (tracks PTS for each VOBU), skips the PTS immediately before the time to a VOBU having a TMAP (address specified by I #start), starts decoding pictures from a leading I picture in the VOBU, and starts displaying pictures from a picture of the time.

Figure 30:
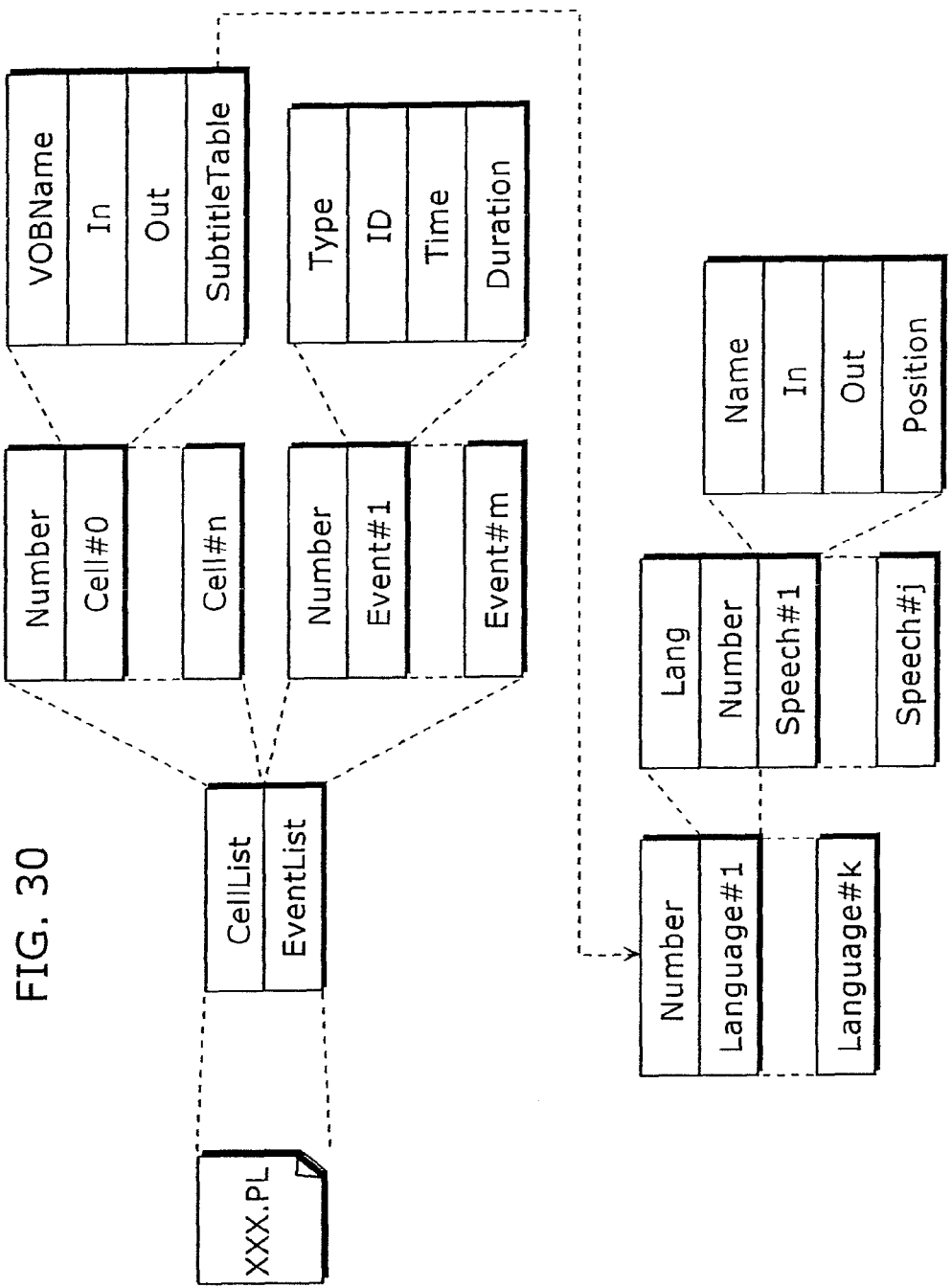
FIG. 30 is a diagram showing a play list file.

Next, with reference to FIG. 30, it is explained about an internal structure of play list information ("XXX. PL").

The play list information is made up of a cell list (Cellist) and an event list (EventList).

The cell list (Cellist) is a playback sequence in a play list, and the cell is played back in an order of description on the list. The contents of the cell list (Cellist) include the number of cells (Number) and each cell information (Cell #1 to Cell #n).

The cell information (Cell #) includes a VOB file name (VOBName), a start time (In) and end time (Out) in the VOB, and a subtitle table. The start time (In) and end time (Out) are described by frame numbers in each VOB, and an address of the VOB data necessary for playback can be obtained by using the time map (TMAP).

The subtitle table is a table having subtitle information to be played back at the same time with the VOB. The subtitle can have a plurality of languages similar to audio, and first information of the subtitle table is made up of a number of languages (Number) and the following table for each language (Language #1 to Language #k).

Each language table (Language #) is made up of a language information (Lang), the number of subtitle information (Number) which is separately displayed, and subtitle information of the subtitle (Speech #1 to Speech #j). The subtitle information (Speech #) is made up of a corresponding image data file name (Name), a subtitle display start time (In), subtitle display end time (Out), and a display position of the subtitle (Position).

The event list (EventList) is a table in which events generated in the play list are defined. The event list is made up of each event (Event #1 to Event #m) following to the number of events (Number). Each event (Event #) is made up of a type of event (Type), an event ID (ID), an event generation time (Time) and a duration.

Figure 31:
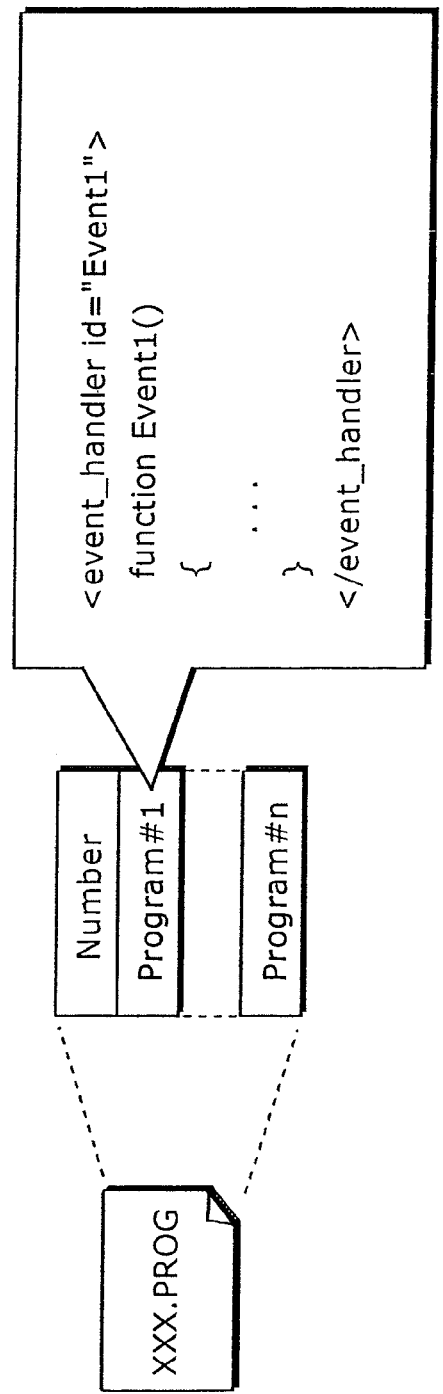
FIG. 31 is a diagram showing a structure of a program file corresponding to the play list.

FIG. 31 is an event handler table ("XXX. PROG") having an event handler (time event and user event for menu selection) for each play list.

The event hander table has a defined event handler/the number of programs (Number) and individual event handler/ program (Program #1 to Program #n). The description in each event handler/program (Program #) has a definition about event handler start (<event_handler>tag) an ID of an event handler paired with the event. After that, the program is described between curly brackets "{" and "}" following to a Function. The events (Event #1 to Event #m) stored in an event list of the "XXX. PL" is specified using an ID of an event handler.

Figure 32:
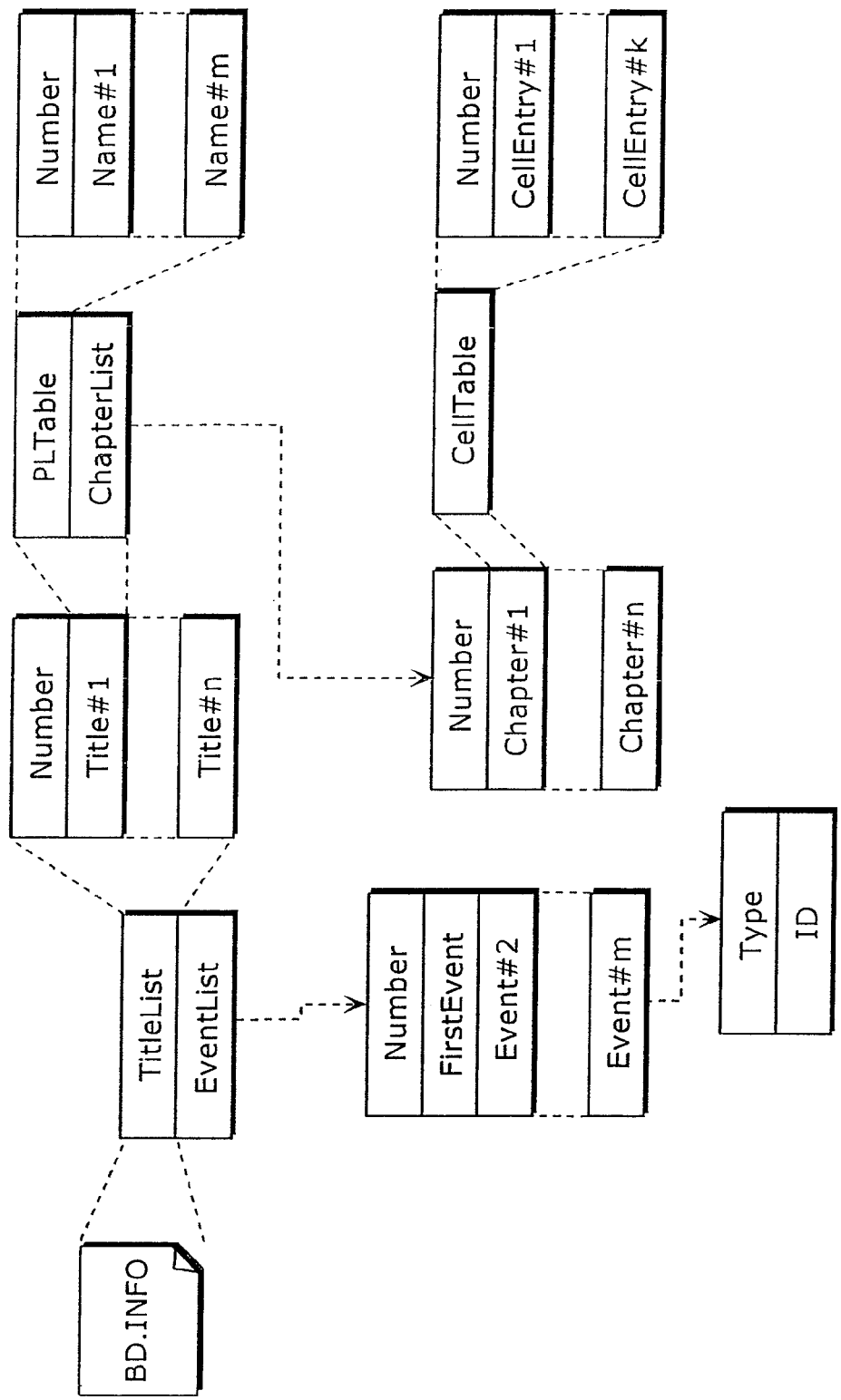
FIG. 32 is a diagram showing a structure of a BD disc total database information file.
Figure 33:
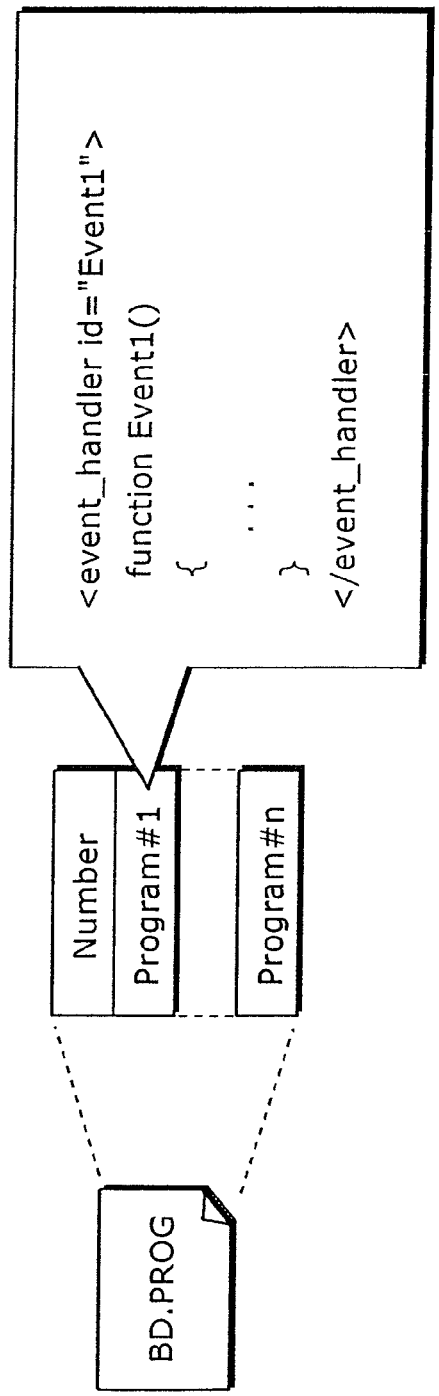
FIG. 33 is a diagram showing a structure of a file for recording global event handler.

Next, with reference to FIG. 32, it is explained about an internal structure of information concerning a BD disc as a whole ("BD. INFO").

The BD disc total information is made up of a title list and an event table for a global event.

The title list is made up of a number of titles in a disc (Number) and the following each title information (Title #1 to Title #n). Each title information (Title #) includes a play list table (PLTable) included in a title and a chapter list in the title. The play list table (PLTable) includes the number of play lists in the title (Number) and a play list name (Name), specifically, a file name of the play list.

The chapter list is made up of a number of chapters (Number) included in the title and individual chapter information (Chapter #1 to Chapter #n). Each pieces of the chapter information (Chapter #) has a table of cells included in the chapter. The cell table is made up of a number of cells (Number) and individual cell entry information (CellEntry #1 to CellEntry #k). The cell entry information (CellEntry #) is described with a play list name including the cell and a cell number in the play list.

The event list (EventList) has a number of global events (Number) and individual global event information. Here, it should be mentioned that a global event defined first is called a first event, which is an event to be called first when a BD disc is inserted to a player. The event information for global event only has an event type (Type) and event ID (ID).

Figure 34:
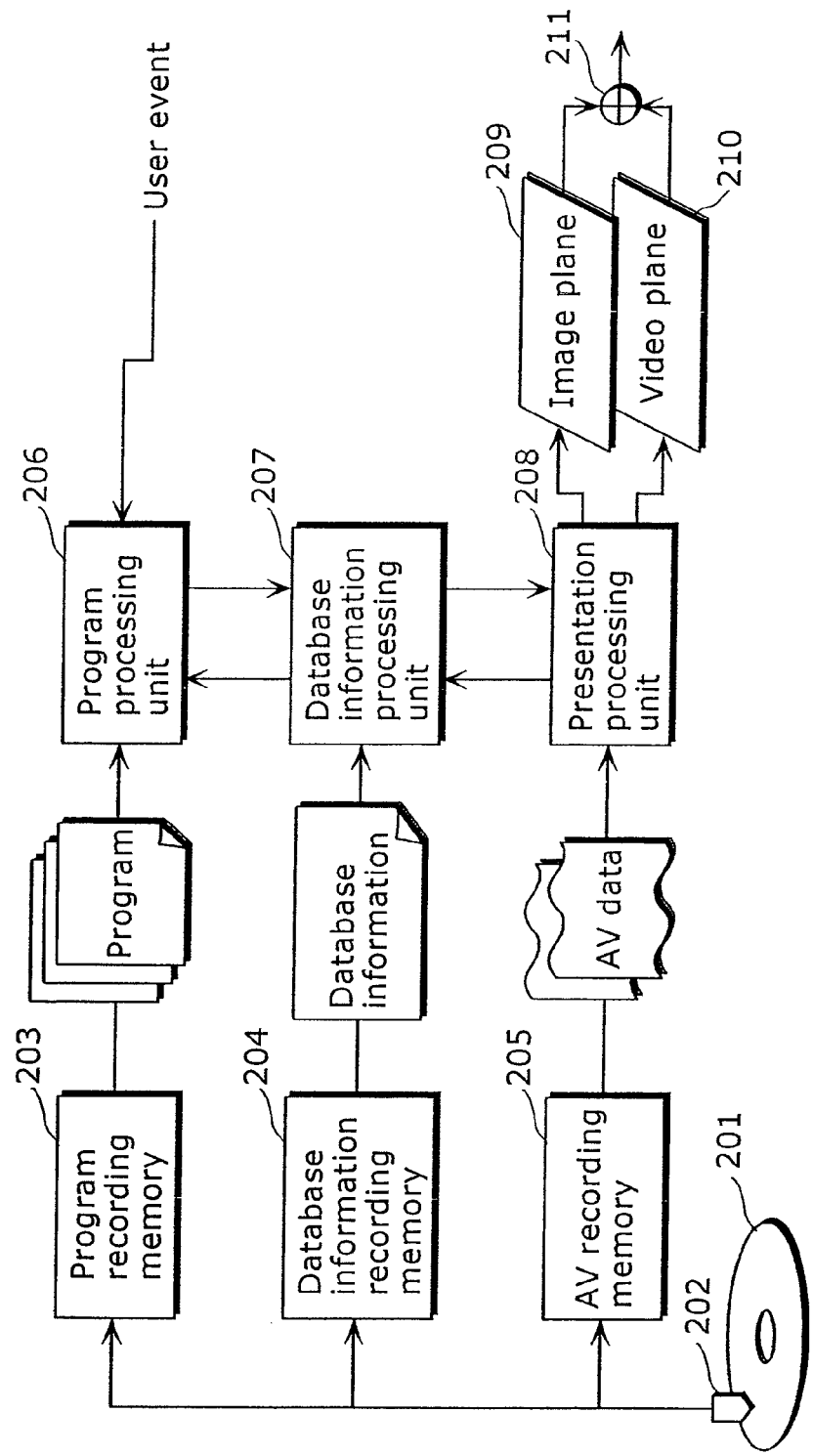
FIG. 34 is a schematic block diagram showing the HD-DVD player according to the sixth embodiment.

FIG. 34 shows a table of a program of a global event handler ("BD. PROG"). This table is same as the event handler table explained in FIG. 32.

In such BD-ROM format, the support information HLP is stored as stream attribute information of the VOB database information. When the support information HLP is used only for the MPEG-4 AVC, the support information HLP may be stored only when the compression method is the MPEG-4 AVC.

Note that, in addition to the stream attribute information and a time map, the support information HLP may be stored by setting an area for storing the playback support information in the VOB database information. Also, the support information HLP may be stored as BD database information other than the VOB database information.

Further, the support information HLP may be stored not only in the BD-ROM format but also in other recording formats such as a BD-RE (Rewritable) as database information.

Sixth Embodiment

FIG. 34 is a block diagram roughly showing a functional structure of a player which plays back data recorded on the BD disc according to the fifth embodiment.

The data recorded on a BD disc (201) are read out through optical pickup (202). The read data is transferred to a special memory depending on respective type of data. The BD playback program (contents of "BD. PROG" or "XXX. PROG" files), the BD database information ("BD. INFO", "XXX. PL" or "YYY. VOBI"), and the AV data ("YYY. VOB" or "ZZZ. PNG") are respectively transferred to a program recording memory (203), a database information recording memory (204) and an AV recording memory (205).

The BD playback program recorded in the program recording memory (203), the BD database information recorded in the database information recording memory (204), and the AV data recorded in the AV recording memory (205) are respectively processed by a program processing unit (206), a database information processing unit (207), and a presentation processing unit (208).

The program processing unit (206) processes a program for receiving information about play lists to be played back by the database information processing unit (207) and event information such as timing of executing a program. Also, the program can dynamically change the play lists to be played back. In this case, it can be realized by sending an instruction of playing back play list to the database information processing unit (207). The program processing unit (206) receives an event from a user, specifically, a request sent from a remote controller key, and executes the event if there is a program corresponding to the user event.

The database information processing unit (207) receives an instruction of the program processing unit (206), analyzes the corresponding play list and database information of a VOB corresponding to the play list, and instructs to play back target AV data to the presentation processing unit (208). Further, the database information processing unit (207) receives standard time information from the presentation processing unit (208), instructs the presentation processing unit (208) to stop the AV data playback based on the time information, and further generates an event indicating a program executing timing for the program processing unit (206).

The presentation processing unit (208) has decoders respectively corresponding to video, audio, and subtitle/image (still picture). Each of the decoders decodes AV data based on an instruction sent from the database information processing unit (207), and outputs the decoded AV data. The video data, subtitle and image are respectively described on a special plane, a video plane (210) and an image plane (209) after they are decoded, and synthesized the images by the synthesizing unit (211) and outputted to a display device such as a television.

Hereafter, it is explained about player operations when trick-play is performed.

The database information processing unit 207 includes a function of the trick-play operation determination unit 53 in the demultiplexer 55 according to the fourth embodiment, when a trick-play instruction signal to perform trick-play such as variable speed playback, reverse playback or jump-in playback is inputted via the program processing unit 206, obtains and analyzes the support information HLP from the database information memory 204, and determines a method of determining operation of decoding and displaying when trick-play is performed. The presentation processing unit 208 includes a function of the decoding/displaying AU determination unit 54 in the demultiplexer 55, determines an AU to be decoded and displayed based on the method determined by the database information processing unit 207, and decoded and displayed the determined AU. Here, the database information processing unit 207 may have the function of the decoding/displaying AU determination unit 54.

Further, when the trick-play information TRK is stored in the BD database information, the database information processing unit 207 obtains the trick-play information TRK from the database information memory 204. The obtained trick-play information TRK is analyzed in the presentation processing unit 208.

Note that each function block in the block diagram shown in FIGS. 10, 15, 18, 22 and 23 can be realized as an LSI that is an integrated circuit apparatus. Such LSI may be incorporated in one or plural chip form (e.g. function blocks other than a memory may be incorporated into a single chip). Here, LSI is taken as an example, however, it may be called "IC", "system LSI", "super LSI" and "ultra LSI" depending on the integration degree.

The method for incorporation into an integrated circuit is not limited to the LSI, and it may be realized with a private line or a general processor. After manufacturing of LSI, a Field Programmable Gate Array (FPGA) that is programmable, or a reconfigurable processor that can reconfigure the connection and settings for the circuit cell in the LSI, may be utilized.

Furthermore, along with the arrival of technique for incorporation into an integrated circuit, which replaces the LSI owing to a progress in semiconductor technology or another technique that has deviated from it, integration of the function blocks may be carried out using the newly-arrived technology. Application of bio-technology may be cited as one of the examples.

Among the function blocks, only a unit for storing data may be constructed separately without being incorporated in a chip form, as the storage medium 115 described in the present embodiment.

Note that the main part in the function blocks shown in FIGS. 10, 15, 18, 22 to 25 and 34 or in the flowcharts shown in FIGS. 13, 14, 16 and 17 can be realized by a processor or a program.

As stated above, it is possible to employ the picture coding method and the picture decoding method presented in the above embodiment in any one of the above-described devices and systems. Accordingly, it becomes possible to achieve the effects described in the aforementioned embodiment.

Seventh Embodiment

In addition, by recording a program for realizing the layout of the moving picture coding method or the moving picture decoding method as shown in each of the above-mentioned embodiments, on a recording medium such as a flexible disk, it becomes possible to perform the processing as shown in each of the above embodiments easily in an independent computer system.

Figure 35A:
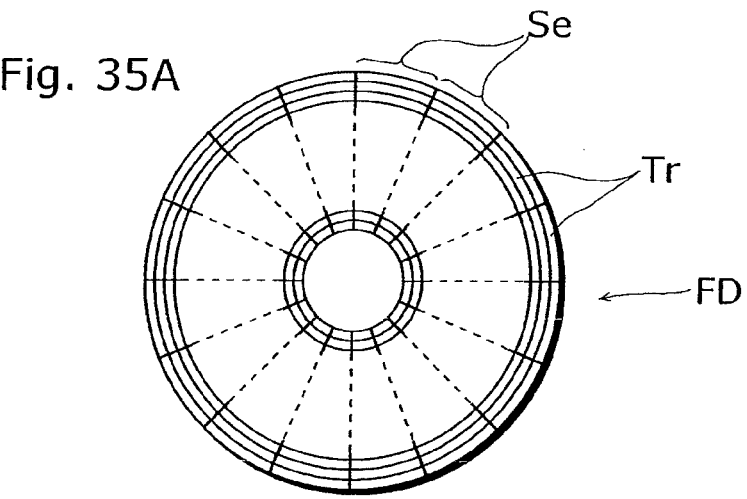
FIG. 35A, FIG. 35B and FIG. 35C show recording media in which a program for realizing a picture coding method and a picture decoding method of the present invention.
Figure 35B:
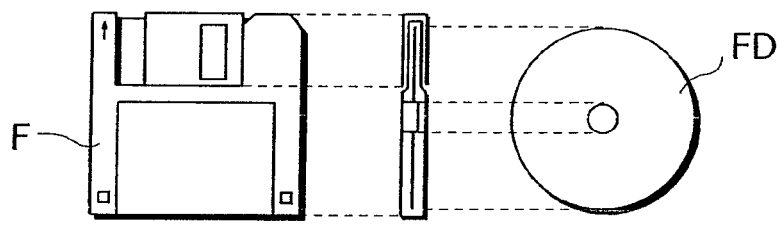
Figure 35C:
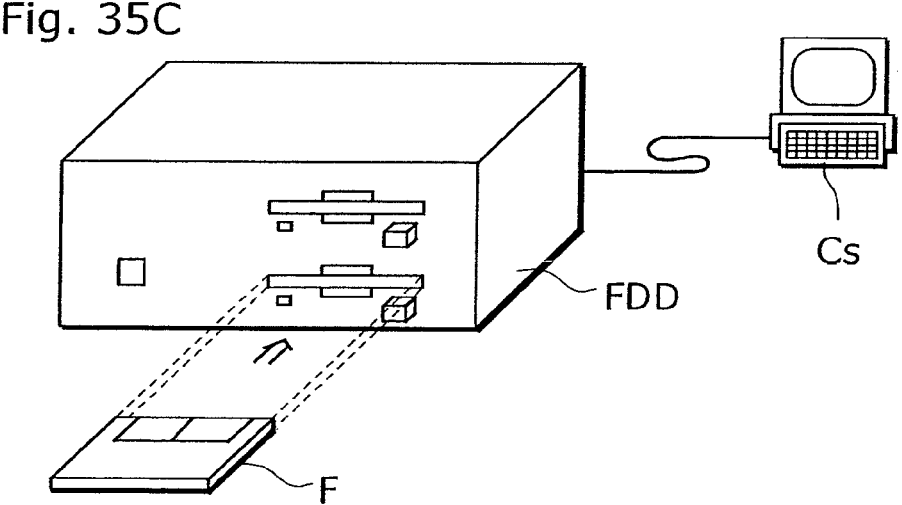

FIG. 35A, FIG. 35B and FIG. 35C are diagrams of a recording medium for recording a program for realizing the moving picture coding method and the moving picture decoding method in the above embodiments in the computer system.

FIG. 35B shows the front view of a flexible disk and the schematic cross-section, as well as a flexible disk itself, whereas FIG. 35A shows an example of a physical format of the flexible disk as a recording medium itself. A flexible disk FD is contained in a case F, a plurality of tracks Tr are formed concentrically on the surface of the disk in the radius direction from the periphery, and each track is separated into 16 sectors Se in the angular direction. Therefore, in the flexible disk storing the above-mentioned program, the above program are recorded in an area allocated for it on the above flexible disk FD In addition, FIG. 35C shows the configuration for recording and playing back the program on and from the flexible disk FD. When the program is recorded on the flexible disk FD, the computer system Cs writes in the moving picture coding method and the moving picture decoding method as the program on the flexible disk FD via a flexible disk drive. When the above moving picture coding method and the moving picture decoding method are constructed in the computer system using the program recorded on the flexible disk, the program is read out from the flexible disk via the flexible disk drive and transferred to the computer system.

Note that the above explanation is made on an assumption that a recording medium is a flexible disk, but the same processing can also be performed using an optical disk. In addition, the recording medium is not limited to these, but any other mediums such as a CD-ROM, memory card, and a ROM cassette can be used in the same manner if a program can be recorded on them.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

A multiplexer and a demultiplexer according to the present invention can perform efficient decoding or displaying when data obtained by multiplexing a stream of MPEG-4 AVC is special-played back, so that the present invention is particularly effective for a playback device of a package media which focuses on a trick-play function.

The invention claimed is:

1. A stream generation apparatus for generating a stream, the stream including information obtained by coding a command for managing a buffer which holds a decoded picture as a reference picture and pixel data of a first coded picture obtained by coding a specific P picture, the pixel data being decodable by selectively referencing an I picture or a P picture preceding the specific P picture in a decoding order and being defined such that a picture subsequent to the specific P picture in the decoding order does not reference a picture preceding the specific P picture in the decoding order, the stream generation apparatus comprising:
   a judging unit configured to judge whether or not a second coded picture is a coded picture corresponding to a P picture which is not referenced when the first coded picture is decoded, the second coded picture being added with first information obtained by coding the command;
   a coding unit configured to code information identical to the command as second information, when the judging unit judges that the second coded picture is the coded picture corresponding to the P picture which is not referenced when the first coded picture is decoded; and
   a generating unit configured to generate the stream by adding the second information to a third coded picture which is a P picture subsequent to the second coded picture in the decoding order and which corresponds to the P picture to be referenced when the first coded picture is decoded.

2. A stream generation method for generating a stream, the stream including information obtained by coding a command for managing a buffer which holds a decoded picture as a reference picture and pixel data of a first coded picture obtained by coding a specific P picture, the pixel data being decodable by selectively referencing an I picture or a P picture preceding the specific P picture in a decoding order and being defined such that a picture subsequent to the specific P picture in the decoding order does not reference a picture preceding the specific P picture in the decoding order, the stream generation method comprising:
   judging whether or not a second coded picture is a coded picture corresponding to a P picture which is not referenced when the first coded picture is decoded, the second coded picture being added with first information obtained by coding the command;
   coding information identical to the command as second information, when it is judged that the second coded picture is the coded picture corresponding to the P picture which is not referenced when the first coded picture is decoded; and
   generating the stream by adding the second information to a third coded picture which is a P picture subsequent to the second coded picture in the decoding order and which corresponds to the P picture to be referenced when the first coded picture is decoded.

3. A method for recording, on a non-transitory computer-readable recording medium, a stream, the stream including information obtained by coding a command for managing a buffer which holds a decoded picture as a reference picture and pixel data of a first coded picture obtained by coding a specific P picture, the pixel data being decodable by selectively referencing an I picture or a P picture preceding the specific P picture in a decoding order and being defined such that a picture subsequent to the specific P picture in the decoding order does not reference a picture preceding the specific P picture in the decoding order, the method comprising:
   judging whether or not a second coded picture is a coded picture corresponding to a P picture which is not referenced when the first coded picture is decoded, the second coded picture being added with first information obtained by coding the command;
   coding information identical to the command as second information, when it is judged that the second coded picture is the coded picture corresponding to the P picture which is not referenced when the first coded picture is decoded; and
   generating the stream by adding the second information to a third coded picture which is a P picture subsequent to the second coded picture in the decoding order and which corresponds to the P picture to be referenced when the first coded picture is decoded.

* * * * *